US012705581B2

(12) United States Patent
Williams et al.

(10) Patent No.: US 12,705,581 B2
(45) Date of Patent: Aug. 11, 2026

(54) ARTIFICIAL INTELLIGENCE FOR FLOOD MONITORING AND REMEDIATION PROVIDER NOTIFICATION

(71) Applicant: STATE FARM MUTUAL AUTOMOBILE INSURANCE COMPANY, Bloomington, IL (US)

(72) Inventors: Aaron Williams, Congerville, IL (US); Joseph Harr, Bloomington, IL (US); Scott T. Christensen, Salem, OR (US); Ryan M. Gross, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 118 days.

(21) Appl. No.: 18/216,420

(22) Filed: Jun. 29, 2023

(65) Prior Publication Data

US 2024/0331068 A1 Oct. 3, 2024

Related U.S. Application Data

(60) Provisional application No. 63/463,399, filed on May 2, 2023, provisional application No. 63/456,727, filed on Apr. 3, 2023.

(51) Int. Cl.
*G06Q 30/0601* (2023.01)
*G06Q 10/109* (2023.01)
(Continued)

(52) U.S. Cl.
CPC ..... *G06Q 10/1097* (2013.01); *G06Q 30/0283* (2013.01); *G06Q 30/0611* (2013.01);
(Continued)

(58) Field of Classification Search
CPC .... G06Q 40/08; G06Q 10/20; G06Q 30/0283; G06Q 30/0611
See application file for complete search history.

(56) References Cited

U.S. PATENT DOCUMENTS 7,698,342 B1 4/2010 Evans et al.
7,818,399 B1 10/2010 Ross et al.
(Continued)

FOREIGN PATENT DOCUMENTS

CA 3227939 A1 2/2023
CN 112164391 A 1/2021
(Continued)

OTHER PUBLICATIONS

Suresh Sankaranarayanan, Malavika Prabhakar, Sreesta Satish, Prerna Jain, Anjali Ramprasad and Aiswarya Krishnan. Flood prediction based on weather parameters using deep learning. Journal of Water and Climat Change. 2020 (Year: 2020).*
(Continued)

*Primary Examiner* — Johnna R Loftis
(74) *Attorney, Agent, or Firm* — MARSHALL, GERSTEIN & BORUN LLP; William J. Samore

(57) ABSTRACT

A computer system for flood monitoring and remediation service provider notification, the computer system may include one or more processors configured to: detect a flood event in a structure, transmit information associated with the structure and a prompt for a flood remediation service quote to a machine learning (ML) chatbot to cause the ML chatbot to request flood cleanup from one or more remediation service providers, receive cost estimates from the one or more remediation service providers, receive schedule availability from the one or more remediation service providers, receive, from the ML chatbot, the cost estimates and the schedule availability, and communicate the cost estimates
(Continued)

and/or the schedule availability to a user associated with the structure.

20 Claims, 7 Drawing Sheets

(51) Int. Cl.
*G06Q 30/0283* (2023.01)
*G06Q 40/08* (2012.01)
*G08B 21/18* (2006.01)
*H04L 51/02* (2022.01)

(52) U.S. Cl.
CPC ........... *G06Q 40/08* (2013.01); *G08B 21/187* (2013.01); *H04L 51/02* (2013.01); *H04M 2201/39* (2013.01)

(56) References Cited

U.S. PATENT DOCUMENTS 8,095,393 B2 1/2012 Seifert et al.
8,346,563 B1 1/2013 Hjelm et al.
9,830,748 B2 11/2017 Rosenbaum
9,990,782 B2 6/2018 Rosenbaum
10,043,217 B1 8/2018 Bolden et al.
10,055,793 B1 8/2018 Call et al.
10,181,159 B1 1/2019 Allen et al.
10,217,068 B1 2/2019 Davis et al.
10,229,394 B1* 3/2019 Davis .................. H04L 41/5074
10,269,190 B2 4/2019 Rosenbaum
10,387,966 B1 8/2019 Shah et al.
10,467,824 B2 11/2019 Rosenbaum
10,482,554 B1* 11/2019 Vukich .................. G06N 3/063
10,497,250 B1* 12/2019 Hayward ............... G06V 20/00
10,535,104 B1 1/2020 Mitchell et al.
10,579,971 B1* 3/2020 Davis ................. G06Q 10/1097
10,635,751 B1 4/2020 Relangi et al.
10,679,296 B1* 6/2020 Devereaux ............. G06Q 10/20
10,769,953 B1 9/2020 Salles et al.
11,038,821 B1 6/2021 Harding et al.
11,087,404 B1 8/2021 Devereaux et al.
11,127,081 B1 9/2021 Kullman et al.
11,227,452 B2 1/2022 Rosenbaum
11,238,506 B1 2/2022 Tomlinson et al.
11,250,515 B1 2/2022 Feiteira et al.
11,407,410 B2 8/2022 Rosenbaum
11,438,283 B1 9/2022 White et al.
11,518,391 B1 12/2022 Sanchez
11,524,707 B2 12/2022 Rosenbaum
11,544,807 B1 1/2023 Breitweiser et al.
11,594,083 B1 2/2023 Rosenbaum
11,669,907 B1 6/2023 Behrens et al.
11,693,726 B2 7/2023 Lozano et al.
11,720,903 B1 8/2023 Henryson et al.
11,757,807 B2 9/2023 Bhardwaj et al.
11,783,421 B2 10/2023 Huls
11,790,296 B1 10/2023 Henryson et al.
11,818,111 B1 11/2023 Debolt
11,836,805 B1 12/2023 Culbertson et al.
11,837,004 B1 12/2023 Agrahari et al.
11,922,515 B1 3/2024 Lombard et al.
12,087,152 B1 9/2024 Buentello et al.
12,217,606 B1 2/2025 Cheng et al.
12,236,377 B2 2/2025 Sohum et al.
2001/0027403 A1 10/2001 Peterson et al.
2001/0037265 A1 11/2001 Kleinberg
2002/0002475 A1 1/2002 Freedman et al.
2002/0112011 A1 8/2002 Washington
2003/0028448 A1 2/2003 Joseph et al.
2006/0212566 A1 9/2006 Boujard et al.
2008/0056473 A1* 3/2008 Kent ..................... H04M 1/663 379/201.01
2009/0125320 A1 5/2009 Bickett
2009/0240531 A1 9/2009 Hilborn
2009/0287509 A1 11/2009 Basak et al.
2010/0145734 A1 6/2010 Becerra et al.
2011/0119574 A1 5/2011 Rogers et al.
2011/0295623 A1 12/2011 Behringer et al.
2011/0313794 A1 12/2011 Feeney
2012/0101852 A1 4/2012 Albert
2012/0124485 A1 5/2012 Scherpa et al.
2012/0143634 A1 6/2012 Beyda et al.
2012/0185544 A1 7/2012 Chang et al.
2012/0303390 A1 11/2012 Brook et al.
2013/0204619 A1 8/2013 Berman et al.
2013/0218603 A1 8/2013 Hagelstein et al.
2013/0226624 A1 8/2013 Blessman et al.
2014/0094991 A1 4/2014 Bouillet et al.
2014/0100892 A1 4/2014 Collopy et al.
2014/0222469 A1 8/2014 Stahl et al.
2014/0358731 A1 12/2014 Itte et al.
2014/0379385 A1 12/2014 Duncan et al.
2015/0170288 A1 6/2015 Harton et al.
2015/0213556 A1 7/2015 Haller, Jr.
2015/0338235 A1 11/2015 Schmidt et al.
2015/0339759 A1 11/2015 Pope et al.
2016/0041069 A1* 2/2016 Huang ................ F02D 41/1495 702/182
2016/0071217 A1 3/2016 Edwards et al.
2016/0086231 A1* 3/2016 Darey ................ G06Q 30/0267 705/14.64
2016/0238397 A1 8/2016 Caira et al.
2016/0273181 A1 9/2016 Smith
2017/0004508 A1* 1/2017 Mansfield ............ G06Q 30/012
2017/0060694 A1* 3/2017 Makhov ................ G06F 16/113
2017/0103346 A1 4/2017 Bodell et al.
2017/0132643 A1 5/2017 Sagade et al.
2017/0132666 A1 5/2017 Slavin
2017/0191848 A1 7/2017 Jones
2018/0047288 A1 2/2018 Cordell et al.
2018/0075538 A1 3/2018 Konrardy et al.
2018/0082683 A1 3/2018 Chen et al.
2018/0173999 A1 6/2018 Renard
2018/0293483 A1 10/2018 Abramson et al.
2018/0293660 A1 10/2018 Rakshe et al.
2018/0334176 A1 11/2018 Park
2019/0037077 A1 1/2019 Konig et al.
2019/0043106 A1 2/2019 Talmor et al.
2019/0095822 A1 3/2019 Rugel et al.
2019/0114715 A1 4/2019 Hessinger et al.
2019/0122121 A1 4/2019 Yu
2019/0306327 A1 10/2019 Matysiak et al.
2019/0332661 A1 10/2019 Halprin et al.
2019/0391827 A1* 12/2019 Simanovich ....... G06Q 30/0281
2020/0019893 A1 1/2020 Lu
2020/0042649 A1 2/2020 Bakis et al.
2020/0073971 A1 3/2020 Elliott
2020/0104876 A1 4/2020 Chintakindi et al.
2020/0143481 A1* 5/2020 Brown .................... H04W 4/02
2020/0154170 A1 5/2020 Wu et al.
2020/0167134 A1 5/2020 Dey et al.
2020/0210490 A1 7/2020 Hutchins
2020/0274962 A1 8/2020 Martin et al.
2020/0285225 A1 9/2020 Lankehanumaiah et al.
2020/0339160 A1 10/2020 Rosenbaum
2021/0064932 A1 3/2021 Wang et al.
2021/0073330 A1 3/2021 Inagaki et al.
2021/0117923 A1 4/2021 Gray et al.
2021/0152496 A1 5/2021 Kim et al.
2021/0200950 A1 7/2021 Basu et al.
2021/0203784 A1 7/2021 Konig et al.
2021/0208744 A1 7/2021 Wood
2021/0256616 A1 8/2021 Hayward et al.
2021/0271820 A1 9/2021 Raghupatruni et al.
2021/0273892 A1 9/2021 Rakshit
2021/0295203 A1 9/2021 Liao et al.
2021/0350357 A1 11/2021 Lafontaine
2021/0357771 A1 11/2021 Flowers et al.
2021/0357790 A1 11/2021 Volkov et al.
2021/0365955 A1 11/2021 Galante et al.
2021/0366048 A1 11/2021 Westhues et al.
2021/0374092 A1 12/2021 Sahay
2021/0383494 A1 12/2021 Leise et al.

(56) References Cited

U.S. PATENT DOCUMENTS

| | | | | |
|---|---|---|---|---|
| 2021/0390950 | A1 | 12/2021 | Kumar et al. | |
| 2021/0406938 | A1 | 12/2021 | Thakral | |
| 2022/0004630 | A1 | 1/2022 | Almukaynizi et al. | |
| 2022/0019496 | A1 | 1/2022 | Lozano et al. | |
| 2022/0084151 | A1 | 3/2022 | Tripathi et al. | |
| 2022/0091957 | A1 | 3/2022 | Szczepanik et al. | |
| 2022/0092893 | A1 | 3/2022 | Rosenbaum | |
| 2022/0094789 | A1 | 3/2022 | Lau et al. | |
| 2022/0114594 | A1 | 4/2022 | Nunes et al. | |
| 2022/0136847 | A1 | 5/2022 | Higuchi et al. | |
| 2022/0176971 | A1 | 6/2022 | Nordh | |
| 2022/0198531 | A1 | 6/2022 | Cleaver et al. | |
| 2022/0207413 | A1 | 6/2022 | Harsha et al. | |
| 2022/0261535 | A1 | 8/2022 | Madaan et al. | |
| 2022/0269583 | A1 | 8/2022 | Plawecki | |
| 2022/0279014 | A1 | 9/2022 | Stokes et al. | |
| 2022/0293107 | A1 | 9/2022 | Leaman et al. | |
| 2022/0300993 | A1 | 9/2022 | Chaudhry et al. | |
| 2022/0308943 | A1 | 9/2022 | Srinivasan et al. | |
| 2022/0340148 | A1 | 10/2022 | Rosenbaum | |
| 2022/0366459 | A1 | 11/2022 | Vieyra | |
| 2022/0391928 | A1 | 12/2022 | Choudhury et al. | |
| 2023/0005070 | A1 | 1/2023 | Nguyen et al. | |
| 2023/0017739 | A1 | 1/2023 | Feldman et al. | |
| 2023/0023869 | A1 | 1/2023 | Ganesan et al. | |
| 2023/0060300 | A1 | 3/2023 | Rosenbaum | |
| 2023/0064816 | A1 | 3/2023 | Matsuoka et al. | |
| 2023/0105564 | A1 | 4/2023 | Breitweiser et al. | |
| 2023/0108454 | A1 | 4/2023 | Gidwaney et al. | |
| 2023/0110941 | A1 | 4/2023 | Makhija et al. | |
| 2023/0116639 | A1 | 4/2023 | Patt et al. | |
| 2023/0140931 | A1 | 5/2023 | Anderson et al. | |
| 2023/0141853 | A1 | 5/2023 | Vu et al. | |
| 2023/0244938 | A1 | 8/2023 | Wei et al. | |
| 2023/0259821 | A1* | 8/2023 | Travalini | G06N 3/0455 706/12 |
| 2023/0267512 | A1 | 8/2023 | Isackson et al. | |
| 2023/0267694 | A1* | 8/2023 | Breitweiser | G06T 19/003 345/633 |
| 2023/0289816 | A1 | 9/2023 | Alfia et al. | |
| 2023/0290502 | A1 | 9/2023 | Zhi et al. | |
| 2023/0298567 | A1 | 9/2023 | Tan et al. | |
| 2023/0316412 | A1 | 10/2023 | Behrens et al. | |
| 2023/0343149 | A1 | 10/2023 | Volos et al. | |
| 2023/0385939 | A1 | 11/2023 | Tsuchiyma et al. | |
| 2023/0410801 | A1 | 12/2023 | Mishra | |
| 2024/0073219 | A1 | 2/2024 | Maizels et al. | |
| 2024/0102814 | A1 | 3/2024 | Karri et al. | |
| 2024/0111960 | A1 | 4/2024 | Earle et al. | |
| 2024/0119424 | A1* | 4/2024 | Lofvers | G06Q 10/20 |
| 2024/0167864 | A1* | 5/2024 | Donovan | G01F 23/804 |
| 2024/0168611 | A1 | 5/2024 | Pham et al. | |
| 2024/0248920 | A1 | 7/2024 | Qiao et al. | |
| 2024/0249557 | A1 | 7/2024 | Chavali | |
| 2024/0256780 | A1 | 8/2024 | Douglas et al. | |
| 2024/0371367 | A1 | 11/2024 | Churgin et al. | |
| 2024/0371376 | A1 | 11/2024 | Bohl et al. | |
| 2025/0013555 | A1 | 1/2025 | Papadopoulos et al. | |

FOREIGN PATENT DOCUMENTS

| | | | |
|---|---|---|---|
| EP | 2946168 | A1 | 11/2015 |
| EP | 3239686 | A1 | 11/2017 |
| EP | 3578433 | B1 | 8/2020 |
| EP | 3730375 | B1 | 10/2021 |
| EP | 3960576 | A1 | 3/2022 |
| EP | 4190659 | A1 | 6/2023 |
| EP | 4190660 | A1 | 6/2023 |
| IN | 201741025968 | | 12/2017 |
| KR | 102148616 | B1 * | 8/2020 |
| WO | 2013/059620 | A2 | 4/2013 |
| WO | 2014/111537 | A1 | 7/2014 |
| WO | 2020/139697 | A1 | 7/2020 |
| WO | 2023/021162 | A2 | 2/2023 |

OTHER PUBLICATIONS

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk-floatbot-activity-7089664064603234304-60TU?utm_source=share&utm_medium=member_android> (2023).

The Future of Car Insurance #2: How AI Is Transforming Auto Insurance for Companies and Drivers, Brogan Woodburn, Rashawn Mitchner, dated Jun. 22, 2023. (Year: 2023).

LIMRA, Should Financial Services Companies Consider Open AI? Web page downloaded from Internet at <https://www.limra.com/en/trending-topics/publications/marketfacts/2023/should-financial-services-companies-consider-open-ai>. Retrieved from Internet on Apr. 28, 2023.

Financial Times, "Insurer Zurich experiments with ChatGPT for claims and data mining" Web page downloaded from Internet at <https://www.ft.com/content/45e5525c-ac45-4a49-a55c-8833d1a036b9 >. Retrieved from internet on Apr. 25, 2023.

Ignites, "Morgan Stanley Developing Chatbot with OpenAI" Web page downloaded from the Internet at <https://www.ignites.com/pc/3979274/514654?all=true>. Retrieved from Internet on Apr. 25, 2023.

Ignites, "The Compliance Tasks Chat GPT Can (and Can't) Handle" Web page downloaded from the Internet at <https://www.ignites.com/pc/4002214/518634?all=true>. Retrieved from the Internet on Apr. 25, 2023.

Life Annuity Specialist, "What ChatGPT's Chores May Look Like in Life Insurance Industry" Web page downloaded from the Internet at <https://www.lifeannuityspecialist.com/pc/4031524/521574?all=true>. Retrieved from the Internet on Apr. 25, 2023.

STIC EIC Search Report for U.S. Appl. No. 18/196,691 (Year: 2024).

Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Munk, Will AI models like ChatGPT take your insurance job?, Life Annuity Speciality (published Mar. 7, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-agent-m-generative-ai-llm>. Retrieved from Internet on Aug. 1, 2023.

Wang et al., Transfer learning-based query classification for intelligent building information spoken dialogue. Automation in Construction. Sep. 1, 2022; 141:104403. (Year: 2022).

"Encrypt Team," "ChatGPT—AI Chat bot—A Complete Guide," www.theencrypt.com 2022 (Year: 2022).

Hossen, K. M., Arefin, M., Hossen, R., & Uddin, M. N. (Oct. 2022). Controlling home appliances adopting chatbot using machine learning approach. In International Conference on Intelligent Computing & Optimization (pp. 253-264). Cham: Springer International Publishing. (Year: 2022).

(56) References Cited

OTHER PUBLICATIONS

Jadhav et al., "Design and Development of Chatbot Based on Reinforcement Learning," Chapter 12, https://doi.org/10.1002/9781119861850.ch12 2022 (Year: 2022).
Mleczko, K. (2021). Chatbot as a tool for knowledge sharing in the maintenance and repair processes. Multidisciplinary Aspects of Production Engineering, 4(1), 499-508. (Year: 2021).
U.S. Appl. No. 18/462,032 ip.com NPL Search History, Report Run Date: Jun. 14, 2025.
Zhang et al., DIALOGPT : Large-Scale Generative Pre-training for Conversational Response Generation, A collaboration between Microsoft Research and Microsoft Dynamics 365 AI Research, pp. 270-278, Jul. 5-Jul. 10, 2020.
Badlani, Multilingual Healthcare Chatbot Using Machine Learning, 2nd International Conference for Emerging Technology (INCET) Belgaum, India, May 21-23, 2021 (Year: 2021).
Dhieb et al., "A Secure AI-Driven Architecture for Automated Insurance Systems: Fraud Detection and Risk Measurement," IEEE Access, 2020 (Year: 2020).
Doultani et al., "Smart Underwriting—A Personalized Virtual Agent," Fifth International Conference on Intelligent Computing and Control Systems, 2021 (Year: 2021).
Jacques et al., "Human-centric dialog training via offline reinforcement learning," arXiv:2010.05848v1 [cs.CL] 2020 (Year: 2020).
Jain, "SpSAN: Sparse self-attentive network-based aspect-aware model for sentiment analysis", Journal of Ambient Intelligence and Humanized Computing 14:3091-3108 (Year: 2021).
Pandiri, "Smart Underwriting: The Role Of AI In Personalizing Homeowners And Renters Insurance Policies" www.migrationletters.com (Year: 2022).
Salem, "ML-based Telegram bot for real estate price prediction", Information Technologies, Telecommunications and Control Systems (ITTCS), 2020 (Year: 2020).
Sen, "Mintaka: A Complex, Natural, and Multilingual Dataset for End-to-End Question Answering", International Conference on Computational Linguistics, pp. 1604-1619 Oct. 12-17, 2022.
Sennrich, "Neural Machine Translation of Rare Words with Subword Unit", Proceedings of the 54th Annual Meeting of the Association for Computational Linguistics, pp. 1715-1725, Berlin, Germany, Aug. 7-12, 2016.
Xiao, "A Transformer-based Attention Flow Model for Intelligent Question and Answering Chatbot", 2022 IEEE 14th International Conference on Computer Research and Development (Year: 2022).
Yu, "AVA: A Financial Service Chatbot Based on Deep Bidirectional Transformers" Front. Appl. Math. Stat., vol. 7—2021 (Year: 2021).

* cited by examiner 200
202
212
210
215
204
222
215
224A
224B
224C
224D
RANKING
226
228
220
Reward
225
206
232
215
250
235
236
234
238
220
Cost 240
Reward 225
+
Final Reward 242

Fig. 2B

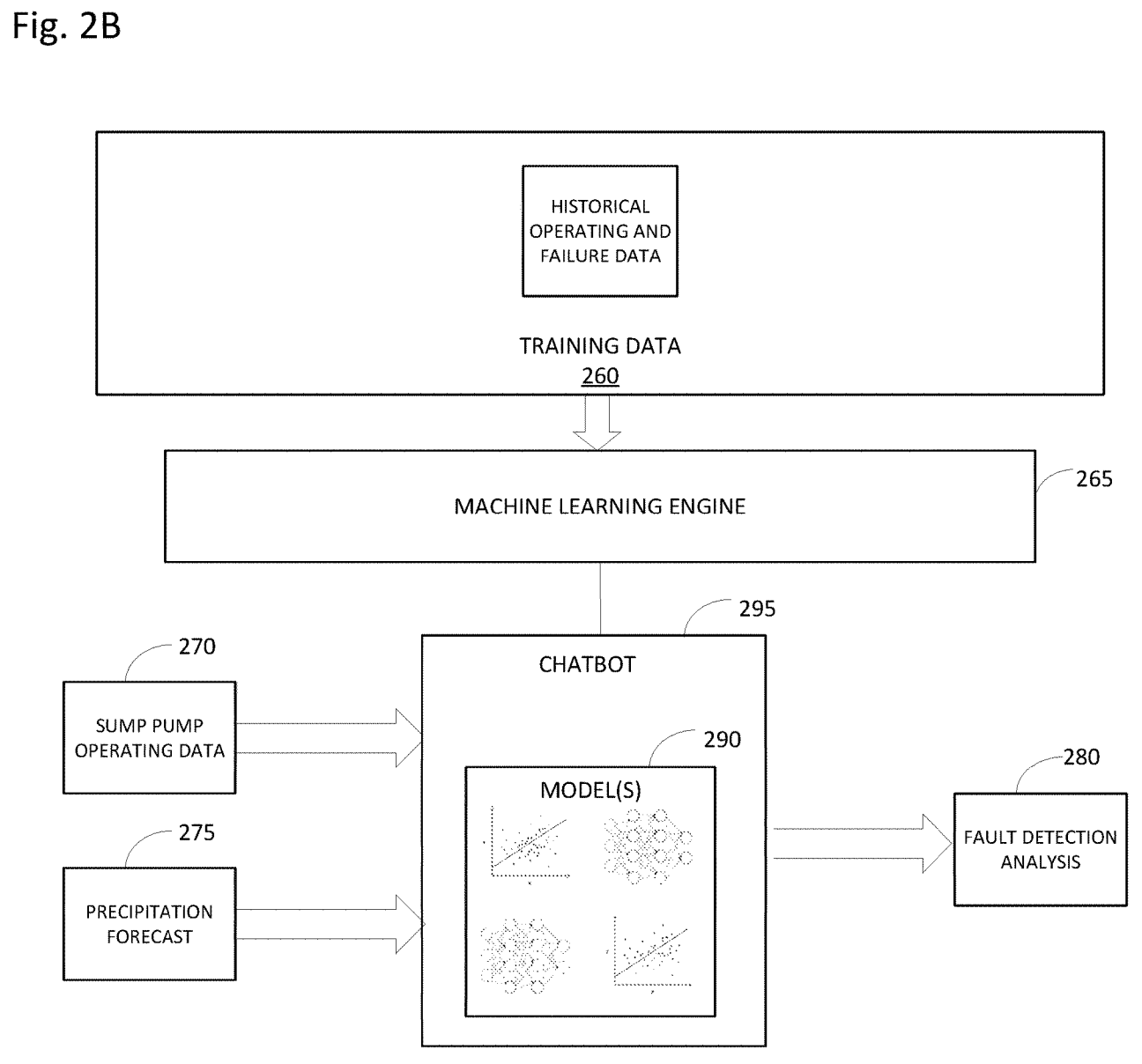

HISTORICAL OPERATING AND FAILURE DATA

TRAINING DATA 260

265

MACHINE LEARNING ENGINE

295

CHATBOT

290

MODEL(S)

280

FAULT DETECTION ANALYSIS

270

SUMP PUMP OPERATING DATA

275

PRECIPITATION FORECAST 300
340A
340B
340N
105
150
360
102
310
320
330

ARTIFICIAL INTELLIGENCE FOR FLOOD MONITORING AND REMEDIATION PROVIDER NOTIFICATION

CROSS-REFERENCE TO RELATED APPLICATIONS

This application claims priority to and the benefit of the filing date of provisional U.S. Patent Application No. 63/456,727 entitled "PARAMETRIC INSURANCE FOR WATER FLOW SENSORS FOR SUMP PUMPS," filed on Apr. 3, 2023, and provisional U.S. Patent Application No. 63/463,399 entitled "PARAMETRIC INSURANCE FOR WATER FLOW SENSORS FOR SUMP PUMPS," filed on May 2, 2023, the entire contents of both applications is hereby expressly incorporated herein by reference.

FIELD OF THE INVENTION

The present disclosure generally relates to sump pump and flood monitoring, and more particularly, remediation provider and/or insurance provider notification via a machine learning chatbot.

BACKGROUND

A sump pump may operate to prevent basements and other underground portions of a structure from flooding. Conventional sensors may detect that a sump pump is faulty and communicate an alert to a user associated with the structure. The user may then contact one or more service providers to have the sump pump repaired or replaced.

Conventional water sensors may detect a flood event in a structure and communicate an alert to a user associated with the structure. The user may then contact one or more service providers to request flood cleanup. The user may also contact an insurance provider to initiate a claim for flood damage.

The conventional sump pump and/or flood detection and service provider and/or insurance provider notification techniques may include additional shortcomings, inefficiencies, encumbrances, ineffectiveness, and/or other drawbacks.

SUMMARY

The present embodiments may relate to, inter alia, systems and methods for detecting flooding and automatically notifying service providers using a machine learning (ML) and/or artificial intelligence (AI) chatbot (or voice bot).

In one aspect, a computer-implemented method for flood monitoring and remediation service provider notification using an ML chatbot (or voice bot) may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer-implemented method may include: (1) detecting, by one or more processors, a flood event in a structure; (2) transmitting, by the one or more processors, information associated with the structure and a prompt for a flood remediation service quote to an ML chatbot; (3) requesting, by the one or more processors via the ML chatbot, flood cleanup from one or more remediation service providers; (4) receiving, by the one or more processors via the ML chatbot, cost estimates from the one or more remediation service providers; (5) receiving, by the one or more processors via the ML chatbot, schedule availability from the one or more remediation service providers; and/or (6) communicating, by the one or more processors, communicate the cost estimates and/or the schedule availability to a user associated with the structure. The method may include additional, less, or alternate functionality or actions, including those discussed elsewhere herein.

In another aspect, a computer system for flood monitoring and remediation service provider notification using an ML chatbot (or voice bot) may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computer system may include one or more processors configured to: (1) detect a flood event in a structure; (2) transmit information associated with the structure and a prompt for a flood remediation service quote to an ML chatbot; (3) request, by the ML chatbot, flood cleanup from one or more remediation service providers; (4) receive, by the ML chatbot, cost estimates from the one or more remediation service providers; (5) receive, by the ML chatbot, schedule availability from the one or more remediation service providers; and/or (6) communicate the cost estimates and/or the schedule availability to a user associated with the structure. The computer system may include additional, less, or alternate functionality, including that discussed elsewhere herein.

In another aspect, a non-transitory computer-readable medium storing processor-executable instructions for flood monitoring and remediation service provider notification using an ML chatbot (or voice bot) may be provided. For example, in one instance, the computer-readable medium may include instructions that, when executed one or more processors to, cause the one or more processors to: (1) detect a flood event in a structure; (2) transmit information associated with the structure and a prompt for a flood remediation service quote to an ML chatbot; (3) request, by the ML chatbot, flood cleanup from one or more remediation service providers; (4) receive, by the ML chatbot, cost estimates from the one or more remediation service providers; (5) receive, by the ML chatbot, schedule availability from the one or more remediation service providers; and/or (6) communicate the cost estimates and/or the schedule availability to a user associated with the structure. The instructions may direct additional, less, or alternate functionality, including that discussed elsewhere herein.

In one aspect, a computer-implemented method for flood monitoring and remediation service provider notification using an AI chatbot (or voice bot) may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer-implemented method may include: (1) detecting, by one or more processors, a flood event in a structure; (2) transmitting, by the one or more processors, information associated with the structure and a prompt for a flood remediation service quote to an AI chatbot; (3) requesting, by the one or more processors via the AI chatbot, flood cleanup from one or more remediation service providers; (4) receiving, by the one or more processors via the AI chatbot, cost estimates from the one or more remediation service providers; (5) receiving, by the one or more processors via the AI chatbot, schedule availability from the one or more remediation service providers; and/or (6) communicating, by the one or more processors, communicate the cost estimates and/or the schedule availability to a user associated with the structure. The method may include additional, less, or alternate functionality or actions, including those discussed elsewhere herein.

In another aspect, a computer system for flood monitoring and remediation service provider notification using an AI chatbot (or voice bot) may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computer system may include one or more processors configured to: (1) detect a flood event in a structure; (2) transmit information associated with the structure and a prompt for a flood remediation service quote to an AI chatbot; (3) request, by the AI chatbot, flood cleanup from one or more remediation service providers; (4) receive, by the AI chatbot, cost estimates from the one or more remediation service providers; (5) receive, by the AI chatbot, schedule availability from the one or more remediation service providers; and/or (6) communicate the cost estimates and/or the schedule availability to a user associated with the structure. The computer system may include additional, less, or alternate functionality, including that discussed elsewhere herein.

In another aspect, a non-transitory computer-readable medium storing processor-executable instructions for flood monitoring and remediation service provider notification using an AI chatbot (or voice bot) may be provided. For example, in one instance, the computer-readable medium may include instructions that, when executed one or more processors to, cause the one or more processors to: (1) detect a flood event in a structure; (2) transmit information associated with the structure and a prompt for a flood remediation service quote to an AI chatbot; (3) request, by the AI chatbot, flood cleanup from one or more remediation service providers; (4) receive, by the AI chatbot, cost estimates from the one or more remediation service providers; (5) receive, by the AI chatbot, schedule availability from the one or more remediation service providers; and/or (6) communicate the cost estimates and/or the schedule availability to a user associated with the structure. The instructions may direct additional, less, or alternate functionality, including that discussed elsewhere herein.

Additional, alternate and/or fewer actions, steps, features and/or functionality may be included in an aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 2B depicts a combined block and logic diagram of an exemplary server generating sump pump fault detection analysis using generative AI/ML.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The computer systems and methods disclosed herein generally relate to, inter alia, methods and systems for sump pump and flood monitoring, and more particularly, remediation provider and/or insurance provider notification using a machine learning (ML) and/or artificial intelligence (AI) chatbot and/or voice bot.

Some embodiments may include one or more of: (1) sump pump fault detection and automatic replacement or repair service requests; (2) flood detection and automatic flood remediation requests; and (3) flood detection and automatic insurance claim filing.

Exemplary Computing Environment

Figure 1:
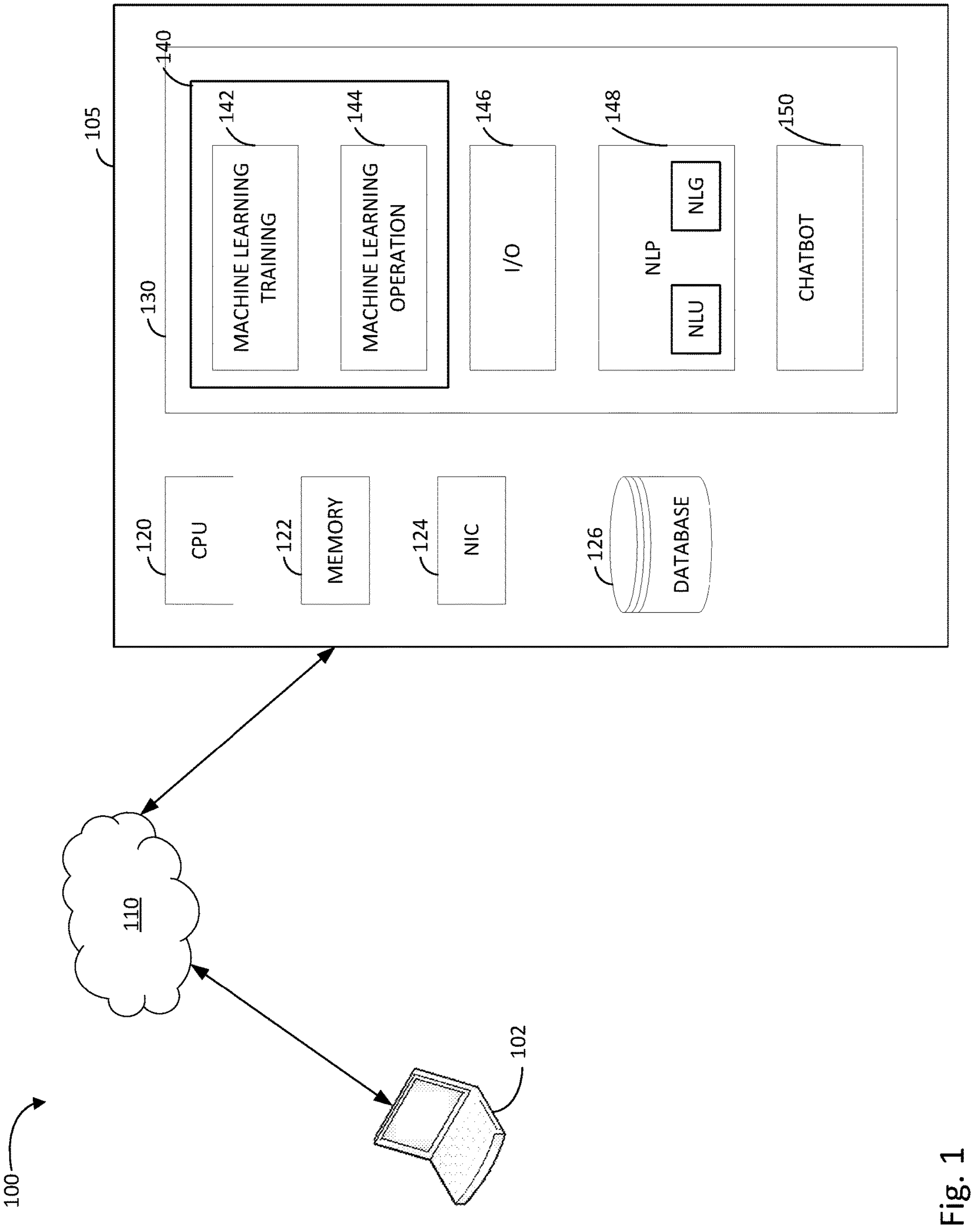
FIG. 1 depicts a block diagram of an exemplary computer system in which methods and systems for sump pump and/or flood monitoring and service provider and/or insurance provider notification are implemented.

FIG. 1 depicts a block diagram of an exemplary computing environment 100 in which sump pump and/or flood monitoring and remediation provider and/or insurance provider notification may be performed, in accordance with various aspects discussed herein.

As illustrated, the computing environment 100 includes a monitoring device 102. The computing environment 100 may further include an electronic network 110 communicatively coupling other aspects of the computing environment 100

The monitoring device 102 may be any suitable device and include one or more Internet of Things (IoT) hubs, smart home devices, mobile devices, wearables, smart watches, smart contact lenses, smart glasses, AR glasses/headsets, virtual reality (VR) glasses/headsets, mixed or extended reality glasses/headsets, voice bots or chatbots, ChatGPT bots, displays, display screens, visuals, and/or other electronic or electrical component. The monitoring device 102 may include a memory and a processor for, respectively, storing and executing one or more modules. The memory may include one or more suitable storage media such as a magnetic storage device, a solid-state drive, random access memory (RAM), etc. The monitoring device 102 may access services or other components of the computing environment 100 via the network 110.

As described herein and in an aspect, one or more servers 105 may perform the functionalities as part of a cloud network or may otherwise communicate with other hardware or software components within one or more cloud computing environments to send, retrieve, or otherwise analyze data or information described herein. For example, in certain aspects of the present techniques, the computing environment 100 may comprise an on-premise computing environment, a multi-cloud computing environment, a public cloud computing environment, a private cloud computing environment, and/or a hybrid cloud computing environment. For example, an entity (e.g., a business) providing a chatbot to enable remediation provider and/or insurance provider notification may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by the a structure owner or lessee. The public cloud may be partitioned using visualization and multi-tenancy techniques and may include one or more infrastructure-as-a-service (IaaS) and/or platform-as-a-service (PaaS) services.

The network 110 may comprise any suitable network or networks, including a local area network (LAN), wide area network (WAN), Internet, or combination thereof. For example, the network 110 may include a wireless cellular service (e.g., 4G, 5G, 6G, etc.). Generally, the network 110 enables bidirectional communication between the monitoring device 102 and the servers 105. In one aspect, the network 110 may comprise a cellular base station, such as cell tower(s), communicating to the one or more components of the computing environment 100 via wired/wireless communications based on any one or more of various mobile phone standards, including NMT, GSM, CDMA, UMTS, LTE, 5G, 6G, or the like. Additionally or alternatively, the network 110 may comprise one or more routers, wireless switches, or other such wireless connection points communicating to the components of the computing environment 100 via wireless communications based on any one or more of various wireless standards, including by non-limiting example, IEEE 802.11a/b/g/n/ac/ax/be (WIFI), Bluetooth, and/or the like.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine-readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, MacOS, etc.) capable of facilitating the functionalities, apps, methods, or other software as discussed herein.

The memory 122 may store a plurality of computing modules 130, implemented as respective sets of computer-executable instructions (e.g., one or more source code libraries, trained ML models such as neural networks, convolutional neural networks, etc.) as described herein.

In general, a computer program or computer based product, application, or code (e.g., the model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang. Python, C, C++, C#, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data and be used to train and/or operate one or more ML models, chatbots, and/or voice bots.

In one aspect, the computing modules 130 may include an ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of ML, such as supervised learning, unsupervised learning, and reinforcement learning.

In one aspect, the ML based algorithms may be included as a library or package executed on server(s) 105. For example, libraries may include the TensorFlow based library, the PyTorch library, the HuggingFace library, and/or the scikit-learn Python library.

In one embodiment, the ML module 140 employs supervised learning, which involves identifying patterns in existing data to make predictions about subsequently received data. Specifically, the ML module is "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprising a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with de novo input that the model has not previously been provided, the model may output one or more predictions, classifications, etc., as described herein.

In one aspect, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as the computer network 110 and/or the user device 102 (for rendering or visualizing) described herein. In one aspect, the servers 105 may include a client-server platform technology such as ASP.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen. The I/O module 146 may facilitate I/O components (e.g., ports, capacitive or resistive touch sensitive input panels, keys, buttons, lights, LEDs), which may be directly accessible via, or attached to, servers 105 or may be indirectly accessible via or attached to the monitoring device 102. According to an aspect, an administrator or operator may access the servers 105 via the monitoring device 102 to review information, make changes, input training data, initiate training via the MLTM 142, and/or perform other functions (e.g., operation of one or more trained models via the MLOM 144).

In one aspect, the computing modules 130 may include one or more NLP modules 148 comprising a set of computer-executable instructions implementing NLP, natural language understanding (NLU) and/or natural language generator (NLG) functionality. The NLP module 148 may be responsible for transforming the user input (e.g., unstructured conversational input such as speech or text) to an interpretable format. The NLP module 148 may include an NLU to understand the intended meaning of utterances and/or prompts, among other things. The NLP module 148 may include an NLG, which may provide text summarization, machine translation, and/or dialog where structured data is transformed into natural conversational language (i.e., unstructured) for output to the user.

In one aspect, the computing modules 130 may include one or more chatbots and/or voice bots 150 which may be programmed to simulate human conversation, interact with users, understand their needs, and recommend an appropriate line of action with minimal and/or no human intervention, among other things. This may include providing the best response of any query that it receives and/or asking follow-up questions.

In some embodiments, the voice bots or chatbots 150 discussed herein may be configured to utilize AI and/or ML techniques. For instance, the voice bot or chatbot 150 may be a ChatGPT chatbot. The voice bot or chatbot 150 may employ supervised or unsupervised ML techniques, which may be followed by, and/or used in conjunction with, reinforced or reinforcement learning techniques. The voice bot or chatbot 150 may employ the techniques utilized for ChatGPT.

Noted above, in some embodiments, a chatbot 150 or other computing device may be configured to implement ML, such that the server 105 "learns" to analyze, organize, and/or process data without being explicitly programmed. ML may be implemented through the ML methods and algorithms. In one exemplary embodiment, the ML module 140 may be configured to implement the ML.

For example, in an aspect, the server 105 may initiate a telephone session over the network 110 with a service provider or insurance agent, e.g., so the server 105 may request sump pump replacement or repair, flood remediation, and or flood reimbursement. As another example, the server 105 may initiate a text-based chat session over the network 110 with a service provider or insurance agent. The chatbot 150 may receive utterances and/or prompts from the service provider or insurance agent, i.e., the input from the provider or agent from which the chatbot 150 needs to derive intents from. The utterances and/or prompts may be processed using NLP module 148 and/or ML module 140 via one or more ML models to recognize what the provider or agent says or types, understand the meaning, determine the appropriate action, and/or respond with language the provider or agent can understand.

In one aspect, the server 105 may host and/or provide an application (e.g., a mobile application), and/or a website configured to provide the application, to receive sump pump and/or flood sensor data from the monitoring device 102. In one aspect, the server 105 may store code in memory 122 which when executed by CPU 120 may provide the website and/or application. In a further aspect, the server 105 may receive the sump pump and/or flood sensor data from the monitoring device 102. In some embodiments, the sump pump and/or flood sensor data may indicate a repository, file location, and/or other data store at which the source code and/or privacy policy may be maintained. In some embodiments, the server 105 may store at least a portion of the sump pump and/or flood sensor data in the database 126. The data stored in the database 126 may be cleaned, labeled, vectorized, weighted and/or otherwise processed, especially processing suitable for data used in any aspect of ML.

In one aspect, the server 105 may host and/or provide an application to initiate and conduct the telephone session and/or chat session with the service provider or insurance agent. In one aspect, the server 105 may store code in memory 122 which when executed by CPU 120 may provide the application. In another aspect, the server 105 may store the received utterances and/or prompts from the service provider or insurance agent, recognition of what the provider or agent says or types, understanding of the meaning, determination of the appropriate action, and/or response in the database 126. The data may be cleaned, labeled, vectorized, weighted and/or otherwise processed, especially processing suitable for data used in any aspect of ML.

In one aspect, when the server 105 evaluates the sump pump data, flood sensor data, and/or service provider and/or insurance agent telephone and/or chat session data, the data may be stored in the database 126. In one aspect, the server 105 may use the stored data to generate, train and/or retrain one or more ML models and/or chatbots 150, and/or for any other suitable purpose.

In operation, ML model training module 142 may access database 126 or any other data source for training data suitable to generate one or more ML models appropriate to receive and/or process the sump pump data, flood sensor data, and/or service provider and/or insurance agent telephone and/or chat session data, e.g., a chatbot 150. The training data may be sample data with assigned relevant and comprehensive labels (classes or tags) used to fit the parameters (weights) of an ML model with the goal of training it by example. In one aspect, training data may include historical data from past notices of sump pump faults and/or flood events. The historical data may include service provider names, cost estimates, schedule availabilities, as well as any other suitable training data. In one aspect, training data may include transcripts of telephone and/or chat sessions with service providers and/or insurance agents. The training data may include user ratings, e.g., 1 to 10 score, of the output provided by the ML model. The ML model trained on such training data will have an improved capability to successfully communicate with a service provider and/or insurance agent when compared to a conventional ML chatbot. In one aspect, once an appropriate ML model is trained and validated to provide accurate predictions and/or responses, e.g., the chatbot 150, the trained model and/or chatbot 150 may be loaded into MLOM 144 at runtime, may process the service provider and/or insurance agent inputs, utterances, and/or prompts, and may generate as an output conversational dialog.

While various embodiments, examples, and/or aspects disclosed herein may include training and generating one or more ML models and/or chatbot 150 for the server 105 to load at runtime, it is also contemplated that one or more appropriately trained ML models and/or chatbot 150 may already exist (e.g., in database 126) such that the server 105 may load an existing trained ML model and/or chatbot 150 at runtime. It is further contemplated that the server 105 may retrain, update and/or otherwise alter an existing ML model and/or chatbot 150 before loading the model at runtime.

Although the computing environment 100 is shown to include one monitoring device 102, one server 105, and one network 110, it should be understood that different numbers of monitoring devices 102, networks 110, and/or servers 105 may be utilized. In one example, the computing environment 100 may include a plurality of servers 105 and hundreds or thousands of monitoring devices 102, all of which may be interconnected via the network 110. Furthermore, the database storage or processing performed by the one or more servers 105 may be distributed among a plurality of servers 105 in an arrangement known as "cloud computing." This configuration may provide various advantages, such as enabling near real-time uploads and downloads of information as well as periodic uploads and downloads of information.

The computing environment 100 may include additional, fewer, and/or alternate components, and may be configured to perform additional, fewer, or alternate actions, including components/actions described herein. Although the computing environment 100 is shown in FIG. 1 as including one instance of various components such as monitoring device 102, server 105, and network 110, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and thus database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 105 and monitoring device 102 may be connected via a direct communication link (not shown in FIG. 1) instead of, or in addition to, via network 130.

Exemplary Training of the ML Chatbot Model

An enterprise may be able to use programmable chatbots, such the chatbot 150 (e.g., ChatGPT), to provide tailored, conversational-like remediation, repair, and/or reimbursement requests. In one aspect, the chatbot may be capable of making a request, providing relevant information, answering service provider and/or insurance agent questions, any of which may assist and/or replace the need for human initiated conversations. Additionally, the chatbot may generate data from service provider and/or insurance agent interactions which the enterprise may use to personalize future support and/or improve the chatbot's functionality, e.g., when retraining and/or fine-tuning the chatbot.

The ML chatbot may provide advanced features as compared to a non-ML chatbot, which may include and/or derive functionality from a large language model (LLM). The ML chatbot may be trained on a server, such as server 105, using large training datasets of text which may provide sophisticated capability for natural-language tasks, such as answering questions and/or holding conversations. The ML chatbot may include a general-purpose pretrained LLM which, when provided with a starting set of words (prompt) as an input, may attempt to provide an output (response) of the most likely set of words that follow from the input. In one aspect, the prompt may be provided to, and/or the response received from, the ML chatbot and/or any other ML model, via a user interface of the server. This may include a user interface device operably connected to the server via an I/O module, such as the I/O module 146. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple service provider and/or insurance agent utterances and/or prompts, which may require the ML chatbot to keep track of an entire conversation history as well as the current state of the conversation. The ML chatbot may rely on various techniques to engage in conversations with service providers and/or insurance agents, which may include the use of short-term and long-term memory. Short-term memory may temporarily store information (e.g., in the memory 122 of the server 105) that may be required for immediate use and may keep track of the current state of the conversation and/or to understand the service provider's and/or insurance agent's latest statement to generate an appropriate response or question. Long-term memory may include persistent storage of information (e.g., on database 126 of the server 105) which may be accessed over an extended period of time. The long-term memory may be used by the ML chatbot to store information about the service provider and/or insurance agent (e.g., preferences, chat history, etc.) and may be useful for improving an overall more effective conversation by enabling the ML chatbot to personalize and/or provide more informed responses or questions.

The system and methods to generate and/or train an ML chatbot model (e.g., via the ML module 140 of the server 105) which may be used by the ML chatbot, may consist of three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses and/or questions to evaluate the responses and/or questions which best mimic preferred human responses and/or questions, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 2A:
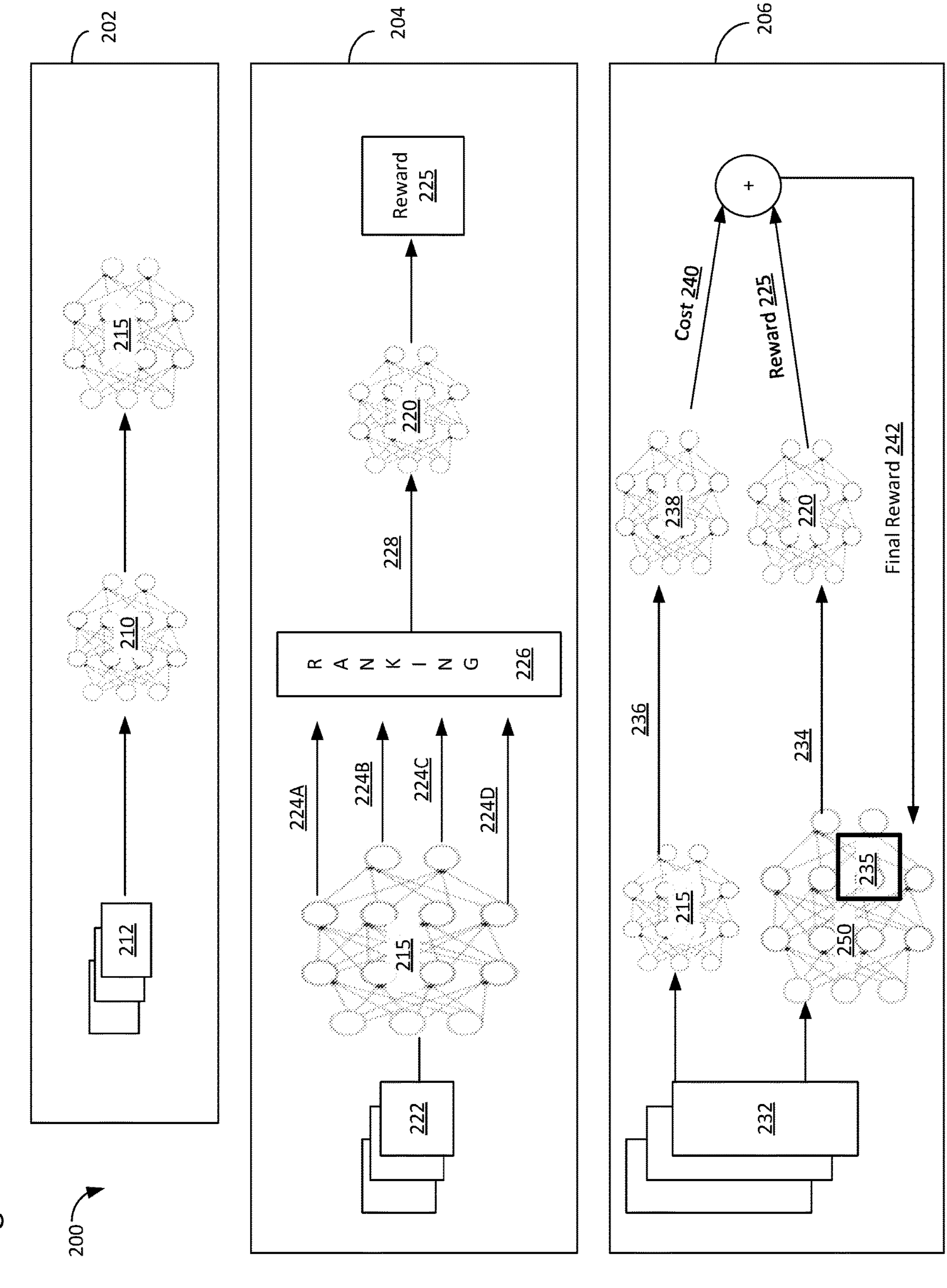
FIG. 2A depicts a combined block and logic diagram in which exemplary computer-implemented methods and systems for training an ML chatbot are implemented.

FIG. 2A depicts a combined block and logic diagram 200 for training an ML chatbot model, in which the techniques described herein may be implemented, according to some embodiments. Some of the blocks in FIG. 2 may represent hardware and/or software components, other blocks may represent data structures or memory storing these data structures, registers, or state variables (e.g., 212), and other blocks may represent output data (e.g., 225). Input and/or output signals may be represented by arrows labeled with corresponding signal names and/or other identifiers. The methods and systems may include one or more servers 202, 204, 206, such as the server 105 of FIG. 1.

In one aspect, the server 202 may fine-tune a pretrained language model 210. The pretrained language model 210 may be obtained by the server 202 and be stored in a memory, such as memory 122 and/or database 126. The pretrained language model 210 may be loaded into an ML training module, such as MLTL 142, by the server 202 for retraining/fine-tuning. A supervised training dataset 212 may be used to fine-tune the pretrained language model 210 wherein each data input prompt to the pretrained language model 210 may have a known output response for the pretrained language model 210 to learn from. The supervised training dataset 212 may be stored in a memory of the server 202. e.g., the memory 122 or the database 126. In one aspect, the data labelers may create the supervised training dataset 212 prompts and appropriate responses. The pretrained language model 210 may be fine-tuned using the supervised training dataset 212 resulting in the SFT ML model 215 which may provide appropriate responses to service provider and/or insurance agent prompts once trained. The trained SFT ML model 215 may be stored in a memory of the server 202, e.g., memory 122 and/or database 126.

In one aspect, the supervised training dataset 212 may include prompts and responses which may be relevant to requesting sump pump repair and/or replacement, flood remediation services, and/or flood reimbursement. For example, a service provider and/or insurance agent prompt may include a question about the structure associated with the sump pump fault and/or flood event. Appropriate responses from the trained SFT ML model 215 may include providing the service provider an address, indication of residential vs. commercial use, size, number of stories, etc. about the structure.

Training the Reward Model

In one aspect, training the ML chatbot model 250 may include the server 204 training a reward model 220 to provide as an output a scaler value/reward 225. The reward model 220 may be required to leverage reinforcement learning with human feedback (RLHF) in which a model (e.g., ML chatbot model 250) learns to produce outputs which maximize its reward 225, and in doing so may provide responses which are better aligned to service provider and/or insurance agent prompts.

Training the reward model 220 may include the server 204 providing a single prompt 222 to the SFT ML model 215 as an input. The input prompt 222 may be provided via an input device (e.g., a keyboard) via the I/O module of the server, such as I/O module 146. The prompt 222 may be previously unknown to the SFT ML model 215, e.g., the labelers may generate new prompt data, the prompt 222 may include testing data stored on database 126, and/or any other suitable prompt data. The SFT ML model 215 may generate multiple, different output responses 224A, 224B, 224C, 224D to the single prompt 222. The server 204 may output the responses 224A, 224B, 224C, 224D via an I/O module (e.g., I/O module 146) to a user interface device, such as a display (e.g., as text responses), a speaker (e.g., as audio/voice responses), and/or any other suitable manner of output of the responses 224A, 224B, 224C, 224D for review by the data labelers.

The data labelers may provide feedback via the server 204 on the responses 224A. 224B, 224C, 224D when ranking 226 them from best to worst based upon the prompt-response pairs. The data labelers may rank 226 the responses 224A, 224B, 224C, 224D by labeling the associated data. The ranked prompt-response pairs 228 may be used to train the reward model 220. In one aspect, the server 204 may load the reward model 220 via the ML module (e.g., the ML module 140) and train the reward model 220 using the ranked response pairs 228 as input. The reward model 220 may provide as an output the scalar reward 225.

In one aspect, the scalar reward 225 may include a value numerically representing a human preference for the best and/or most expected response to a prompt, i.e., a higher scaler reward value may indicate the service provider and/or insurance agent is more likely to prefer that response, and a lower scalar reward may indicate that the service provider and/or insurance agent is less likely to prefer that response. For example, inputting the "winning" prompt-response (i.e., input-output) pair data to the reward model 220 may generate a winning reward. Inputting a "losing" prompt-response pair data to the same reward model 220 may generate a losing reward. The reward model 220 and/or scalar reward 236 may be updated based upon labelers ranking 226 additional prompt-response pairs generated in response to additional prompts 222.

In one example, a data labeler may provide to the SFT ML model 215 as an input prompt 222. "Describe the sky." The input may be provided by the labeler via the user device 102 over network 110 to the server 204 running a chatbot application utilizing the SFT ML model 215. The SFT ML model 215 may provide as output responses to the labeler via the user device 102: (i) "the sky is above" 224A; (ii) "the sky includes the atmosphere and may be considered a place between the ground and outer space" 224B; and (iii) "the sky is heavenly" 224C. The data labeler may rank 226, via labeling the prompt-response pairs, prompt-response pair 222/224B as the most preferred answer; prompt-response pair 222/224A as a less preferred answer; and prompt-response 222/224C as the least preferred answer. The labeler may rank 226 the prompt-response pair data in any suitable manner. The ranked prompt-response pairs 228 may be provided to the reward model 220 to generate the scalar reward 225.

While the reward model 220 may provide the scalar reward 225 as an output, the reward model 220 may not generate a response (e.g., text). Rather, the scalar reward 225 may be used by a version of the SFT ML model 215 to generate more accurate responses to prompts, i.e., the SFT model 215 may generate the response such as text to the prompt, and the reward model 220 may receive the response to generate a scalar reward 225 of how well humans perceive it. Reinforcement learning may optimize the SFT model 215 with respect to the reward model 220 which may realize the configured ML chatbot model 250.

RLHF to Train the ML Chatbot Model

In one aspect, the server 206 may train the ML chatbot model 250 (e.g., via the ML module 140) to generate a response 234 to a random, new and/or previously unknown service provider and/or insurance agent prompt 232. To generate the response 234, the ML chatbot model 250 may use a policy 235 (e.g., algorithm) which it learns during training of the reward model 220, and in doing so may advance from the SFT model 215 to the ML chatbot model 250. The policy 235 may represent a strategy that the ML chatbot model 250 learns to maximize its reward 225. As discussed herein, based upon prompt-response pairs, a human labeler may continuously provide feedback to assist in determining how well the ML chatbot's 250 responses match expected responses to determine rewards 225. The rewards 225 may feed back into the ML chatbot model 250 to evolve the policy 235. Thus, the policy 235 may adjust the parameters of the ML chatbot model 250 based upon the rewards 225 it receives for generating good responses. The policy 235 may update as the ML chatbot model 250 provides responses 234 to additional prompts 232.

In one aspect, the response 234 of the ML chatbot model 250 using the policy 235 based upon the reward 225 may be compared 238 to the SFT ML model 215 (which may not use a policy) response 236 of the same prompt 232. The server 206 may compute a penalty 240 based upon the comparison 238 of the responses 234, 236. The penalty 240 may reduce the distance between the responses 234, 236, i.e., a statistical distance measuring how one probability distribution is different from a second, in one aspect the response 234 of the ML chatbot model 250 versus the response 236 of the SFT model 215. Using the penalty 240 to reduce the distance between the responses 234, 236 may avoid a server over-optimizing the reward model 220 and deviating too drastically from the human-intended/preferred response. Without the penalty 240, the ML chatbot model 250 optimizations may result in generating responses 234 which are unreasonable but may still result in the reward model 220 outputting a high reward 225.

In one aspect, the responses 234 of the ML chatbot model 250 using the current policy 235 may be passed by the server 206 to the rewards model 220, which may return the scalar reward 225. The ML chatbot model 250 response 234 may be compared 238 to the SFT ML model 215 response 236 by the server 206 to compute the penalty 240. The server 206 may generate a final reward 242 which may include the scalar reward 225 offset and/or restricted by the penalty 240. The final reward 242 may be provided by the server 206 to the ML chatbot model 250 and may update the policy 235, which in turn may improve the functionality of the ML chatbot model 250.

To optimize the ML chatbot 250 over time, RLHF via the human labeler feedback may continue ranking 226 responses of the ML chatbot model 250 versus outputs of earlier/other versions of the SFT ML model 215, i.e., providing positive or negative rewards 225. The RLHF may allow the servers (e.g., servers 204, 206) to continue iteratively updating the reward model 220 and/or the policy 235. As a result, the ML chatbot model 250 may be retrained and/or fine-tuned based upon the human feedback via the RLHF process, and throughout continuing conversations may become increasingly efficient.

Although multiple servers 202, 204, 206 are depicted in the exemplary block and logic diagram 200, each providing one of the three steps of the overall ML chatbot model 250 training, fewer and/or additional servers may be utilized and/or may provide the one or more steps of the ML chatbot model 250 training. In one aspect, one server may provide the entire ML chatbot model 250 training.

Exemplary ML Model for Sump Pump Fault Detection Analysis

In one embodiment, determining whether a sump pump is faulty may use ML.

FIG. 2B schematically illustrates how an ML model may generate a sump pump fault detection analysis. Some of the blocks in FIG. 2B represent hardware and/or software components (e.g., block 265), other blocks represent data structures or memory storing these data structures, registers, or state variables (e.g., blocks 260), and other blocks represent output data (e.g., block 280). Input and output signals are represented by arrows.

An ML engine 265 may include one or more hardware and/or software components, such as the MLTM 142 and/or the MLOM 144, to obtain, create, (re)train, operate and/or save one or more ML models 290. To generate an ML model 290, the ML engine 265 may use training data 260.

As described herein, the server such as server 105 may obtain and/or have available various types of training data 260 (e.g., stored on database 126 of server 105). In an aspect, the training data 260 may labeled to aid in training, retraining and/or fine-tuning the ML model 290. The training data 260 may include historical operating and failure data for one or more sump pumps. The historical operating and failure data may comprise model number, age, hours of service, current drawn, operating temperature, flow rate, and/or any other suitable information about the sump pumps at or near the time of failure. The training data 260 may be in a structured or unstructured format. New training data 260 may be used to retrain or update the ML model 290.

While the example training data includes indications of various types of training data 260, this is merely an example for ease of illustration only. The training data 260 may include any suitable data that may indicate associations between sump pump operating data and detection of a fault.

In an aspect, the server may continuously update the training data 260, e.g., based upon obtaining data sources related to the data collected from prior sump pump failures, or any other training data. Subsequently, the ML model 290 may be retrained/fine-tuned based upon the updated training data 260. Accordingly, the generation of fault detection analyses may improve over time.

In an aspect, the ML engine 265 may process and/or analyze the training data 260 (e.g., via MLTM 142) to train the ML model 290 to generate the fault detection analysis 280. The ML model 290 may be trained to generate the fault detection analysis 280 via a neural network, deep learning model, Transformer-based model, generative pretrained transformer (GPT), generative adversarial network (GAN), regression model, k-nearest neighbor algorithm, support vector regression algorithm, and/or random forest algorithm, although any type of applicable ML model/algorithm may be used, including training using one or more of supervised learning, unsupervised learning, semi-supervised learning, and/or reinforcement learning.

Once trained, the ML model 290 may perform operations on one or more data inputs to produce a desired data output. In one aspect, the ML model 290 may be loaded at runtime (e.g., by the MLOM 144) from a database (e.g., the database 126 of the server 105) to process sump pump operating data 270 and/or precipitation forecast 275 input. The server, such as server 105, may obtain the process sump pump operating data 270 and/or precipitation forecast 275 and use them as input to generate the fault detection analysis 280. The server may use the precipitation forecast 275 to predict whether the sump pump will be able to keep up with the forecasted precipitation. In one aspect, the server may obtain the sump pump operating data 270 via the client device 102, a website, the chatbot 150, or any other suitable user device. In one aspect, the server may obtain the precipitation forecast 275 via the client device 102, a website, the chatbot 150, or any other suitable source.

In one aspect, the sump pump operating data 270 may comprise model number, age, hours of service, current drawn, operating temperature, flow rate, and/or any other suitable information about a sump pump. In one aspect, the precipitation forecast 275 may comprise a probability of precipitation and/or an amount of precipitation over a number of upcoming days.

Once the fault detection analysis 280 is generated by ML model 290, it may be provided to the client device 102, server 105, or to another user device. For example, the server 105 may provide the fault detection analysis 280 via a mobile app to mobile device, in an email, a website, via a chatbot (such as the chatbot 295), and/or in any other suitable manner.

Figure 3:
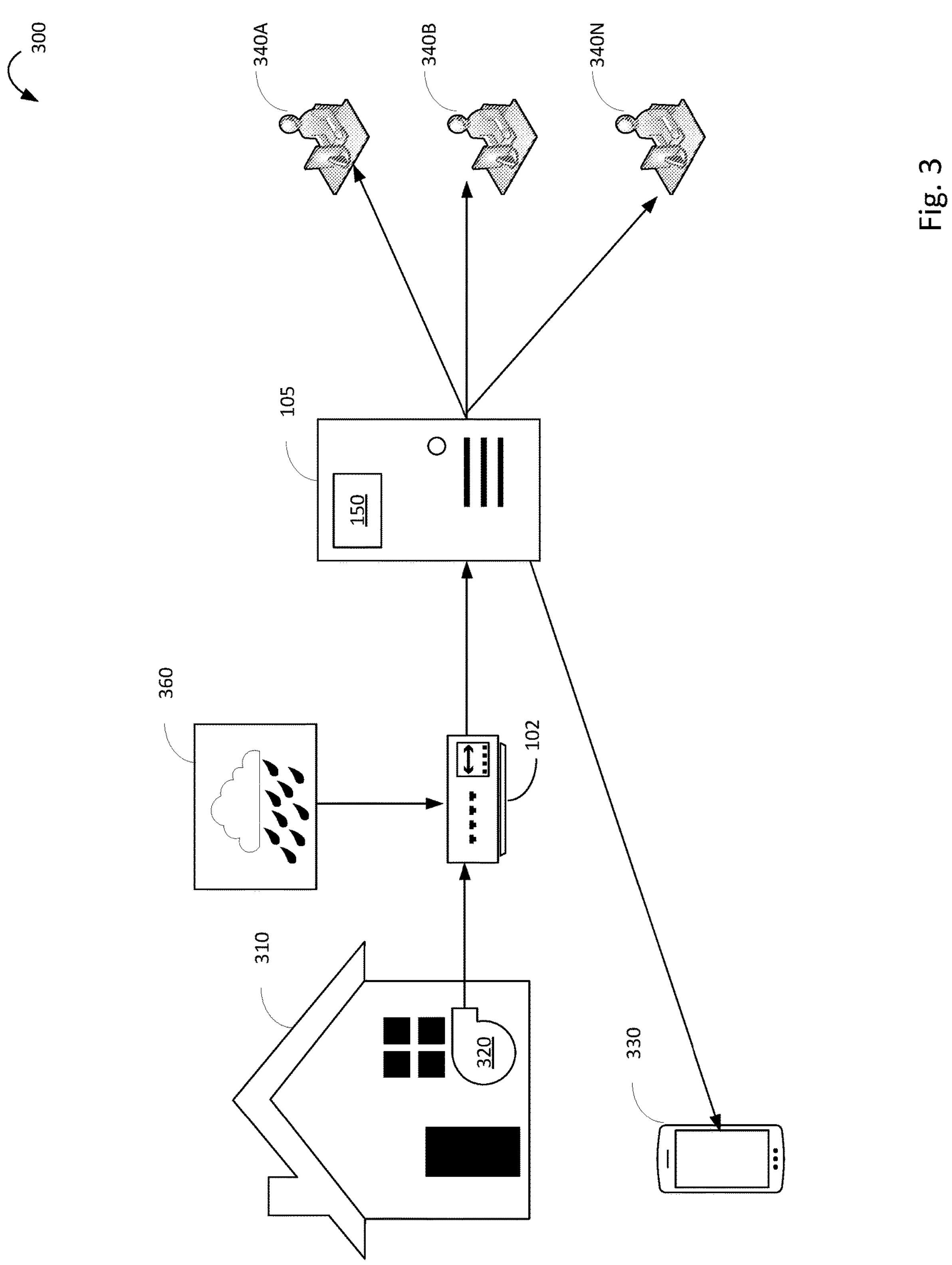
FIG. 3 depicts an exemplary environment for sump pump monitoring and service provider notification using an ML chatbot.

Exemplary Computer System for Sump Pump Monitoring and Service Provider Notification FIG. 3 depicts an exemplary environment 300 in which methods and systems for sump pump fault monitoring and service provider notification may be performed, in accordance with various aspects discussed herein.

In one aspect, a structure 310 may comprise one or more sump pumps 320. In one aspect, the structure 310 may be a house, apartment, condominium, or any other type of residential dwelling. In another aspect, the structure 310 may be a high rise tower, shopping center, data center, factory, warehouse, or any other type of commercial building. The structure 310 may comprise subterranean levels, such as a basement, parking garage, loading dock, etc.

In one aspect, the sump pump 320 may be powered by electricity, steam, water pressure, or compressed air. The sump pump 320 may run continuously, manually, or automatically via a water level sensing switch. In one aspect, the sump pump 320 may comprise one or more operation sensors that detect if the sump pump 320 is faulty. The operation sensors may be integrated into the sump pump 320 or may comprise separate components. The operation sensors may detect if the sump pump 320 is inoperable or impaired. The operation sensors may measure an electrical current drawn by the sump pump 320, measure an operating temperature of the sump pump 320, and/or measure water pressure or a flow rate at an output of the sump pump 320. The operation sensors may detect a water level in a sump.

In one aspect, exemplary environment 300 may comprise one or more monitoring devices 102. The monitoring device 102 may comprise an application for monitoring sump pump status and/or operating data. The monitoring device 102 may be located within the structure 310 or may be located remotely. The monitoring device 102 may receive analog and/or digital signals from the operation sensors via a wired connection. The monitoring device 102 may receive serial data from the operation sensors via a protocol such as I2C, SPI, RS232, or USB. The monitoring device 102 may receive and/or send network communications with the operation sensors via a wired protocol, such as Ethernet. The monitoring device 102 may receive and/or send network communications with the operation sensors via a wireless protocol, such as cellular, WiFi, Bluetooth, Zigbee, or LoRaWAN. The monitoring device 102 may receive status and/or operating data from the operation sensors. The monitoring device 102 may determine that the sump pump 320 is faulty based upon the received status and/or an alarm from a water sensor. In one aspect, the monitoring device 102 may transmit a sump pump fault alert to the server 105. The monitoring device 102 may transmit the sump pump fault alert automatically (without human intervention) or after receiving a confirmation from a user.

In one aspect, the monitoring device 102 may receive weather data. For example, the monitoring device 102 may receive weather data from a weather server 360. The weather server 360 may be operated by a government entity, news organization, security company, or any other organization. The weather server 360 may transmit notifications of weather data to the monitoring device 102. The monitoring device 102 may periodically poll the weather server 360 and request weather data. The weather data may comprise a weather forecast and/or weather alerts, such as a flood alert. The weather data may indicate an occurrence of precipitation and/or precipitation exceeding a specified amount.

In one aspect, the monitoring device 102 may periodically transmit sump pump operating data and/or weather data to the server 105. The monitoring device 102 may transmit a location of the structure 310, a description of the structure 310, a description of the sump pump 320, the sump pump operating data, and/or other relevant information.

In one aspect, exemplary environment 300 may comprise one or more servers 105. The server 105 may comprise a chatbot 150 and/or an ML model 290. The server 105 may determine that the sump pump 320 is faulty based upon the operating data received from the monitoring device. The server 105 may determine that the sump pump 320 is faulty based upon the received operating data and a weather forecast predicting precipitation.

The server 105 may comprise or retrieve information from a database of sump pump service providers. The server 105 may also retrieve a list of sump pump service providers from an online source, such as a search engine or a directory. The server may comprise or retrieve information from a database of information about structures, including the structure 310, and/or information about sump pumps, such as the sump pump 320. After receiving the sump pump fault alert or after determining the sump pump 320 is faulty from the monitoring device 102, the server 105 may identify a subset of sump pump service providers 340A-340N within a certain geographic area associated with the structure 310.

The server 105 may generate one or more requests for information via a chatbot 150. In one aspect, the chatbot 150 is an ML chatbot, although the chatbot 150 may be an AI chatbot, a voice bot and/or any other suitable chatbot/voice bot as described herein. The server 105 may select an appropriate chatbot based upon the method of communication with the service providers.

In one aspect, the chatbot 150 may initiate communications with one or more of the of sump pump service providers 340A-340N to request sump pump repair and/or replacement. The chatbot 150 may communicate with one service provider at a time or with a plurality of service providers simultaneously. The chatbot 150 may communicate with the sump pump service providers 340A-340N via (i) audio (e.g., a telephone call), (ii) text messages (e.g., short messaging/SMS, multimedia messaging/MMS, iPhone iMessages, etc.), (iii) instant messages (e.g., real-time messaging such as a chat window), (iv) video such as video conferencing, and/or any other suitable communication means. The chatbot 150 may communicate with a human and/or another chatbot. The chatbot 150 may operate in a conversational manner and provide and collect information without any human intervention.

In one aspect, the chatbot 150 may receive utterances via an audio connection with one or more of the sump pump service providers 340A-340N (e.g., as part of a voice call initiated by the chatbot 150). The chatbot 150 may transcribe the audio utterances into unformatted text. The NLP module 148 may convert the unformatted text into structured input data. The server 150 may store the structured input data in the database 126. The ML module 140 may generate structured output data based on the input data. The NLP module 148 may convert the structured output data into unformatted text. The chatbot may convert the unformatted text into audio data and output the audio data, e.g., a follow up question, to the service provider.

The chatbot 150 may provide the location of the structure 310, the description of the structure 310, the description of the sump pump 320, the received operating data, and/or other relevant information to the service providers 340A-340N. The chatbot 150 may ask the service providers 340A-340N questions, such as what sump pump models they have in stock, what sump pump models they service, schedule availability, estimated price, and/or other questions to gather relevant information. For example, the chatbot 150 may ask the service provider 340A to confirm it repairs and/or replaces sump pumps. The chatbot 150 may provide information about the sump pump 320, such as the manufacturer and/or model number. The chatbot 150 may provide information about the structure 310, such as whether it is a residential house or a commercial building, and the address of the structure 310. The chatbot 150 may ask the service provider 340A what dates(s) and time(s) are available for the service provider 340A to send a technician to the structure 310 to repair or replace the sump pump 320. The chatbot 150 may ask the service provider 340A for an estimated charge for repairing and/or replacing the sump pump 320, including parts and labor. The chatbot 150 may negotiate a lower price with the service providers 340A-340N based upon the service provider 340A's estimated charge. For example, the chatbot 150 may ask service provider 340B to match an estimated charge provided by service provider 340A.

The server 105 may collect information from the service providers 340A-340N. The server 105 may analyze and/or process the collected information to interpret, understand and/or extract relevant information within one or more responses from the service provider. In one aspect, the server 105 may select one of the service providers 340A-340N based upon the relevant information. For example, the server 105 may select the service provider having the lowest price, the earliest schedule availability, or a combination of factors from the relevant information. The chatbot 150 may initiate communication with the selected service provider to order sump pump repair and/or replacement. In another aspect, the server 105 may select a subset of one or more of the service providers 340A-340N based upon the relevant information. For example, the server 105 may select the subset of one or more service providers having the lowest prices, the earliest schedule availabilities, or a combination of factors from the relevant information. The chatbot 150 may initiate communication with a user device 330 and provide the selected subset of service providers and the relevant information from that selected subset of service providers.

The user device 330 may comprise one or more of desktop computers, laptops, smartphones, wearables, smart watches, smart contact lenses, smart glasses, augmented reality glasses, virtual reality headsets, mixed or extended reality glasses or headsets, and/or any other suitable communication device. The chatbot 150 may communicate with the user device 330 via audio, text messages, instant messages, video, e-mail, application notifications, and/or any other suitable communication means. A user may select one of the service providers via the user device 330, which may communicate the service provider selection to the chatbot 150. The chatbot 150 may initiate communication with the selected service provider to order sump pump repair and/or replacement. The selected service provider and the relevant information from selected service provider may be stored by the server 105 in memory, such as the memory 122 and/or database 126.

In one aspect, the server 105, e.g., via NLP model 148 and/or the chatbot 150, may analyze the communication sessions with the service providers 340A-340N and/or the user for indications of sentiment, such as the emotion of the service provider or user (e.g., upset, stressed, calm, frustrated, impatient, etc. Other types of suitable analysis and/or analytics may be obtained from the communication session information.

In one aspect, types of data the communication sessions may generate may include the length of the session, which may indicate how effective the chatbot 150 is at gathering or providing necessary information (e.g., a short session may not gather enough information; a long session may provide too much and/or inaccurate information). Another type of data the session may generate may include how many requests were generated by the chatbot 150, which may also indicate the quality and/or effectiveness of the session (e.g., too few questions may not gather enough information and too many questions may indicate ineffectiveness of the questions being asked). The number of requests may also indicate when the session warrants termination, for example the chatbot 150 may no longer have any requests to generate which may indicate all information relevant may be gathered. Any suitable analytics and/or data may be generated and or analyzed from the session which may indicate the quality and/or effectiveness of the session and/or chatbot 150.

In one aspect, the chatbot 150 may determine a confidence level at one or more instances during the communication session. The confidence level and/or score, which may be a number between 0 and 1, may represent the likelihood that the output of the chatbot 150 is correct and will satisfy the service provider's or the user's request. As the output of the chatbot 150 may include one or more predictions, each prediction may have a confidence score wherein the higher the score, the more confident the chatbot 150 is that the prediction may satisfy the service provider's or the user's request. In conversational AI/ML which may include the chatbot 150, one or more stages may process the request and/or input of the service provider or the user. In one aspect, during NLU, the chatbot 150 may predict the service provider or user intent (what the service provider or user is looking for) from an utterance/prompt (what the service provider or user may say or type). In one aspect, during sentiment and/or emotion analysis, the chatbot 102 may predict the sentiment (e.g., positive, negative, or neutral) and/or the emotion of the service provider or user based upon the service provider or user utterance and/or prompts (back and forth between the service provider or user and the chatbot 150) transcript. In one aspect, during NLG, the chatbot 150 may predict what to respond based upon the service provider or user utterance/prompt. One or more of these predictions may have an associated confidence score/level.

In one aspect, the server 105 and/or chatbot 150 may determine the confidence level based upon the interactions between the chatbot 150 and the service provider or user during the communication session, e.g., how accurately does it seem the chatbot 150 is able to interpret the service provider or user responses, how effective are chatbot 150 requests, and/or other suitable metrics and/or analysis of the communication session to determine the confidence level of the chatbot 150. In one aspect, the chatbot 150 confidence level may be compared to a threshold confidence level (e.g., which may also be a value between 0 and 1) by the server 105 and/or chatbot 150. If the chatbot 150 confidence level falls below the threshold, one or more actions may be taken by the server 105 and/or chatbot 150, such as ending the communication session, using a different chatbot 150 to continue the communication session (e.g., one which may be trained to more effectively assist the service provider or user), and/or any other suitable action as may be described herein.

Figure 4:
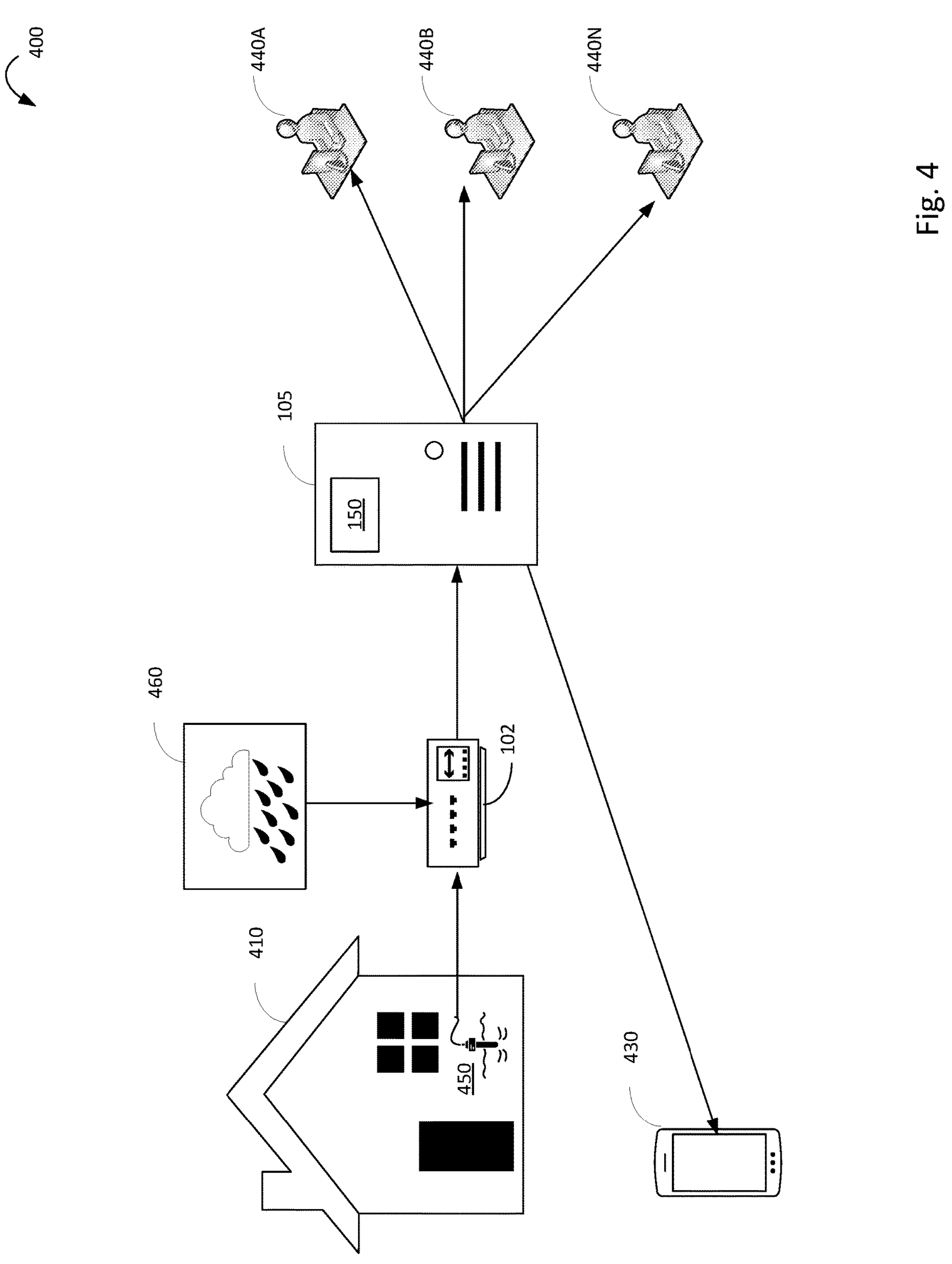
FIG. 4 depicts an exemplary environment for flood monitoring and service provider notification using an ML chatbot.

Exemplary Computer System for Flood Monitoring and Service Provider Notification FIG. 4 depicts an exemplary environment 400 in which methods and systems for flood monitoring and service provider notification may be performed, in accordance with various aspects discussed herein.

In one aspect, a structure 410 may comprise one or more sensors 450. In one aspect, the structure 410 may be a house, apartment, condominium, or any other type of residential dwelling. In another aspect, the structure 410 may be a high rise tower, shopping center, data center, factory, warehouse, or any other type of commercial building. The structure 410 may comprise subterranean levels, such as a basement, parking garage, loading dock, etc.

In one aspect, the sensors 450 may be water sensors, such as a conductive sensor, a capacitive sensor, an optical sensor, or a float switch. The sensors 450 may detect an interruption of electrical power to the structure.

In one aspect, exemplary environment 400 may comprise one or more monitoring devices 102. The monitoring device 102 may comprise an application for monitoring data from the sensors 350. The monitoring device 102 may be located within the structure 410 or may be located remotely. The monitoring device 102 may receive analog and/or digital signals from the sensors 450 via a wired connection. The monitoring device 102 may receive serial data from the operation sensors via a protocol such as I2C, SPI, RS232, or USB. The monitoring device 102 may receive and/or send network communications with the sensors 450 via a wired protocol, such as Ethernet. The monitoring device 102 may receive and/or send network communications with the sensors 450 via a wireless protocol, such as cellular, WiFi, Bluetooth, Zigbee, or LoRaWAN. The monitoring device 102 may receive water detection alarms and/or electrical power interruption alarms from the sensors 450. The monitoring device 102 may determine that the structure 410 is experiencing a flood based upon the received water detection alarms.

In one aspect, the monitoring device 102 may determine that that the structure 410 is experiencing a flood based upon received weather data. The monitoring device 102 may determine that that the structure 410 is experiencing a flood based upon received weather data and electrical power interruption alarms from the sensors 450. For example, the monitoring device 102 may receive weather data from a weather server 460. The weather server 460 may be operated by a government entity, news organization, security company, or any other organization. The weather server 460 may transmit notifications of weather data to the monitoring device 102. The monitoring device 102 may periodically poll the weather server 460 and request weather data. The weather data may comprise a weather forecast and/or weather alerts, such as a flood alert. The weather data may indicate an occurrence of precipitation and/or precipitation exceeding a specified amount.

In one aspect, the monitoring device 102 may transmit a flood alert to the server 105. The monitoring device 102 may transmit the flood alert automatically, i.e., without human intervention, or after receiving a confirmation from a user. The monitoring device 102 may transmit a location of the structure 410, a description of the structure 410, alarm information from the sensors 450, and/or other relevant information.

In one aspect, exemplary environment 400 may comprise one or more servers 105. The server 105 may comprise a chatbot 150. The server 105 may comprise or retrieve information from a database of flood remediation service providers. The server 105 may also retrieve a list of flood remediation service providers from an online source, such as a search engine or a directory. The server may comprise or retrieve information from a database of information about structures, including the structure 410. After receiving the flood alert from the monitoring device 102, the server 105 may identify a subset of flood remediation service providers 440A-440N within a certain geographic area associated with the structure 410.

The server 105 may generate one or more requests for information via a chatbot 150. In one aspect, the chatbot 150 is an ML chatbot, although the chatbot 150 may be an AI chatbot, a voice bot and/or any other suitable chatbot/voice bot as described herein. The server 105 may select an appropriate chatbot based upon the method of communication with the service providers.

In one aspect, the chatbot 150 may initiate communications with one or more of the of flood remediation service providers 440A-440N to request flood remediation. The chatbot 150 may communicate with one service provider at a time or with a plurality of service providers simultaneously. The chatbot 150 may communicate with the flood remediation providers 440A-440N via (i) audio (e.g., a telephone call), (ii) text messages (e.g., short messaging/SMS, multimedia messaging/MMS, iPhone iMessages, etc.), (iii) instant messages (e.g., real-time messaging such as a chat window), (iv) video such as video conferencing, and/or any other suitable communication means. The chatbot 150 may communicate with a human and/or another chatbot. The chatbot 150 may operate in a conversational manner and provide and collect information without any human intervention.

In one aspect, the chatbot 150 may receive utterances via an audio connection with one or more of the sump pump service providers 440A-440N (e.g., as part of a voice call initiated by the chatbot 150). The chatbot 150 may transcribe the audio utterances into unformatted text. The NLP module 148 may convert the unformatted text into structured input data. The server 150 may stored the structured input data in the database 126. The ML module 140 may generate structured output data based on the input data. The NLP module 148 may convert the structured output data into unformatted text. The chatbot may convert the unformatted text into audio data and output the audio data, e.g., a follow up question, to the service provider.

The chatbot 150 may provide the location of the structure 410, the description of the structure 410, the received flood alert information, and/or other relevant information to the service providers 440A-440N. The chatbot 150 may ask the service providers 440A-440N questions, such as whether they have water pumps available, schedule availability, estimated price, and/or other questions to gather relevant information. For example, the chatbot 150 may ask the service provider 440A to confirm it provides flood remediation services. The chatbot 150 may provide information gathered from the sensors, such as which portions of the structure 410 are flooded. The chatbot 150 may provide information about the structure 310, such as whether it is a residential house or a commercial building, and the address of the structure 310. The chatbot 150 may ask the service provider 440A what dates(s) and time(s) are available for the service provider 440A to send a technician to the structure 410 to begin remediation work. The chatbot 150 may ask the service provider 440A for an estimated charge for the flood remediation. The chatbot 150 may negotiate a lower price with the service providers 440A-440N based on the service provider 440A's estimated charge. For example, the chatbot 150 may ask service provider 440B to match an estimated charge provided by service provider 440A.

The server 105 may collect information from the service providers 440A-440N. The server 105 may analyze and/or process the collected information to interpret, understand and/or extract relevant information within one or more responses from the service provider. In one aspect, the server 105 may select one of the service providers 440A-440N based upon the relevant information. For example, the server 105 may select the service provider having the lowest price, the earliest schedule availability, or a combination of factors from the relevant information. The chatbot 150 may initiate communication with the selected service provider to order flood remediation services. In another aspect, the server 105 may select a subset of one or more of the service providers 440A-440N based upon the relevant information. For example, the server 105 may select the subset of one or more service providers having the lowest prices, the earliest schedule availabilities, or a combination of factors from the relevant information. The chatbot 150 may initiate communication with a user device 430 and provide the selected subset of service providers and the relevant information from that selected subset of service providers.

The user device 430 may comprise one or more of desktop computers, laptops, smartphones, wearables, smart watches, smart contact lenses, smart glasses, augmented reality glasses, virtual reality headsets, mixed or extended reality glasses or headsets, and/or any other suitable communication device. The chatbot 150 may communicate with the user device 430 via audio, text messages, instant messages, video, e-mail, application notifications, and/or any other suitable communication means. A user may select one of the service providers via the user device 430, which may communicate the service provider selection to the chatbot 150. The chatbot 150 may initiate communication with the selected service provider to order flood remediation services. The selected service provider and the relevant information from selected service provider may be stored by the server 105 in memory, such as the memory 122 and/or database 126.

In one aspect, the server 105, e.g., via NLP model 148 and/or the chatbot 150, may analyze the communication sessions with the service providers 440A-440N and/or the user for indications of sentiment, such as the emotion of the service provider or user (e.g., upset, stressed, calm, frustrated, impatient, etc. Other types of suitable analysis and/or analytics may be obtained from the communication session information.

In one aspect, types of data the communication sessions may generate may include the length of the session, which may indicate how effective the chatbot 150 is at gathering or providing necessary information (e.g., a short session may not gather enough information; a long session may provide too much and/or inaccurate information). Another type of data the session may generate may include how many requests were generated by the chatbot 150, which may also indicate the quality and/or effectiveness of the session (e.g., too few questions may not gather enough information and too many questions may indicate ineffectiveness of the questions being asked). The number of requests may also indicate when the session warrants termination, for example the chatbot 150 may no longer have any requests to generate which may indicate all information relevant may be gathered. Any suitable analytics and/or data may be generated and or analyzed from the session which may indicate the quality and/or effectiveness of the session and/or chatbot 150.

In one aspect, the chatbot 150 may determine a confidence level at one or more instances during the communication session. The confidence level and/or score, which may be a number between 0 and 1, may represent the likelihood that the output of the chatbot 150 is correct and will satisfy the service provider's or the user's request. As the output of the chatbot 150 may include one or more predictions, each prediction may have a confidence score wherein the higher the score, the more confident the chatbot 150 is that the prediction may satisfy the service provider's or the user's request. In conversational AI/ML which may include the chatbot 150, one or more stages may process the request and/or input of the service provider or the user. In one aspect, during NLU, the chatbot 150 may predict the service provider or user intent (what the service provider or user is looking for) from an utterance/prompt (what the service provider or user may say or type). In one aspect, during sentiment and/or emotion analysis, the chatbot 102 may predict the sentiment (e.g., positive, negative, or neutral) and/or the emotion of the service provider or user based upon the service provider or user utterance and/or prompt (back and forth between the service provider or user and the chatbot 150) transcript. In one aspect, during NLG, the chatbot 150 may predict what to respond based upon the service provider or user utterance/prompt. One or more of these predictions may have an associated confidence score/level.

In one aspect, the server 105 and/or chatbot 150 may determine the confidence level based upon the interactions between the chatbot 150 and the service provider or user during the communication session, e.g., how accurately does it seem the chatbot 150 is able to interpret the service provider or user responses, how effective are chatbot 150 requests, and/or other suitable metrics and/or analysis of the communication session to determine the confidence level of the chatbot 150. In one aspect, the chatbot 150 confidence level may be compared to a threshold confidence level (e.g., which may also be a value between 0 and 1) by the server 105 and/or chatbot 150. If the chatbot 150 confidence level falls below the threshold, one or more actions may be taken by the server 105 and/or chatbot 150, such as ending the communication session, using a different chatbot 150 to continue the communication session (e.g., one which may be trained to more effectively assist the service provider or user), and/or any other suitable action as may be described herein.

Figure 5:
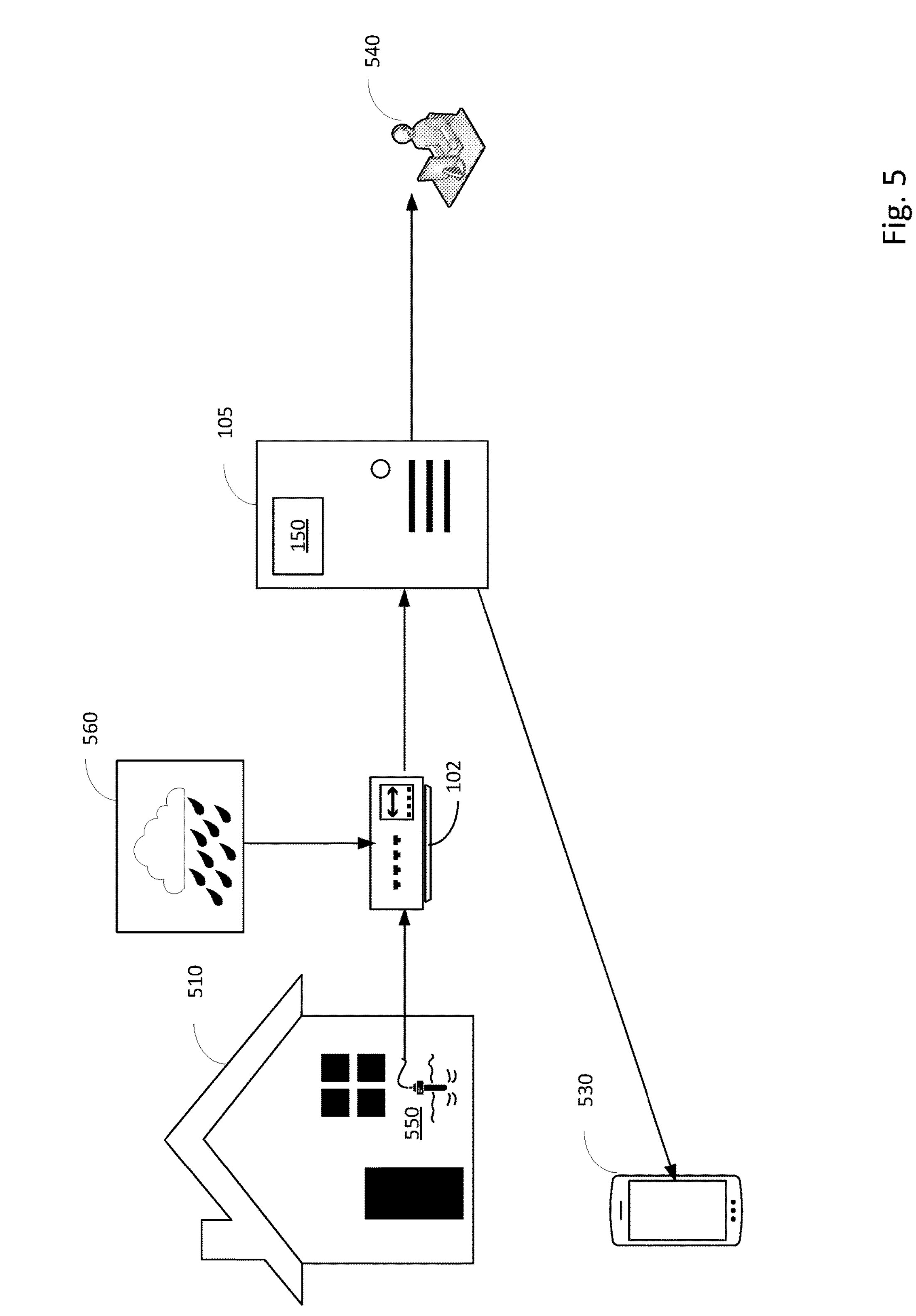
FIG. 5 depicts an exemplary environment for flood monitoring and insurance provider notification using an ML chatbot.

Exemplary Computer System for Flood Monitoring and Insurance Provider Notification FIG. 5 depicts an exemplary environment 500 in which methods and systems for flood monitoring and insurance provider notification may be performed, in accordance with various aspects discussed herein.

In one aspect, a structure 510 may comprise one or more sensors 550. In one aspect, the structure 510 may be a house, apartment, condominium, or any other type of residential dwelling. In another aspect, the structure 510 may be a high rise tower, shopping center, data center, factory, warehouse, or any other type of commercial building. The structure 510 may comprise subterranean levels, such as a basement, parking garage, loading dock, etc.

In one aspect, the sensors 550 may be water sensors, such as a conductive sensor, a capacitive sensor, an optical sensor, or a float switch. The sensors 550 may detect an interruption of electrical power to the structure.

In one aspect, exemplary environment 500 may comprise one or more monitoring devices 102. The monitoring device 102 may comprise an application for monitoring data from the sensors 550. The monitoring device 102 may be located within the structure 510 or may be located remotely. The monitoring device 102 may receive analog and/or digital signals from the sensors 550 via a wired connection. The monitoring device 102 may receive serial data from the operation sensors via a protocol such as I2C, SPI, RS232, or USB. The monitoring device 102 may receive and/or send network communications with the sensors 550 via a wired protocol, such as Ethernet. The monitoring device 102 may receive and/or send network communications with the sensors 550 via a wireless protocol, such as cellular, WiFi, Bluetooth, Zigbee, or LoRaWAN. The monitoring device 102 may receive water detection alarms and/or electrical power interruption alarms from the sensors 550. The monitoring device 102 may determine that the structure 510 is experiencing a flood based upon the received water detection alarms.

In one aspect, the monitoring device 102 may determine that that the structure 510 is experiencing a flood based upon received weather data. The monitoring device 102 may determine that that the structure 510 is experiencing a flood based upon received weather data and electrical power interruption alarms from the sensors 550. For example, the monitoring device 102 may receive weather data from a weather server 560. The weather server 560 may be operated by a government entity, news organization, security company, or any other organization. The weather server 560 may transmit notifications of weather data to the monitoring device 102. The monitoring device 102 may periodically poll the weather server 560 and request weather data. The weather data may comprise a weather forecast and/or weather alerts, such as a flood alert. The weather data may indicate an occurrence of precipitation and/or precipitation exceeding a specified amount.

In one aspect, the monitoring device 102 may transmit a flood alert to the server 105. The monitoring device 102 may transmit the flood alert automatically, i.e., without human intervention, or after receiving a confirmation from a user. The monitoring device 102 may transmit a location of the structure 510, a description of the structure 510, alarm information from the sensors 550, and/or other relevant information.

In one aspect, exemplary environment 500 may comprise one or more servers 105. The server 105 may comprise a chatbot 150. The server 105 may comprise or retrieve insurance information from a database regarding the structure 510, including insurance provider contact information and flood coverage. The server may comprise or retrieve information from a database of information about structures, including the structure 510. After receiving the flood alert from the monitoring device 102, the server 105 may identify the insurance provider 540 with the structure 510.

The server 105 may generate one or more requests for information via a chatbot 150. In one aspect, the chatbot 150 is an ML chatbot, although the chatbot 150 may be an AI chatbot, a voice bot and/or any other suitable chatbot/voice bot as described herein. The server 105 may select an appropriate chatbot based upon the method of communication with the service providers.

In one aspect, the chatbot 150 may initiate communications with the insurance provider 540 to initiate a flood reimbursement claim. The insurance provider 540 may be an insurance company that issued the policy on the structure 510 or an independent insurance agent. The chatbot 150 may communicate with the insurance provider 540 via (i) audio (e.g., a telephone call), (ii) text messages (e.g., short messaging/SMS, multimedia messaging/MMS, iPhone iMessages, etc.), (iii) instant messages (e.g., real-time messaging such as a chat window), (iv) video such as video conferencing, and/or any other suitable communication means. The chatbot 150 may communicate with a human and/or another chatbot. The chatbot 150 may operate in a conversational manner and provide and collect information without any human intervention.

In one aspect, the chatbot 150 may receive utterances via an audio connection from the insurance provider 540 (e.g., as part of a voice call initiated by the chatbot 150). The chatbot 150 may transcribe the audio utterances into unformatted text. The NLP module 148 may convert the unformatted text into structured input data. The server 150 may store the structured input data in the database 126. The ML module 140 may generate structured output data based on the input data. The NLP module 148 may convert the structured output data into unformatted text. The chatbot may convert the unformatted text into audio data and output the audio data, e.g., a follow up question, to the insurance provider 540.

The chatbot 150 may provide the location of the structure 510, the description of the structure 510, insurance policy number associated with the structure 510, the received flood alert information, and/or other relevant information to the insurance provider 540. The chatbot 150 may ask the insurance provider 540 questions, such as when an adjuster will be available to inspect the structure 510, will the insurance provider 540 provide a flood remediation contractor, and/or other questions to gather relevant information. The server 105 may collect information from the insurance provider 540. The server 105 may analyze and/or process the collected information to interpret, understand and/or extract relevant information within one or more responses from the insurance provider 540.

The chatbot may provide the relevant information to a user device 530. The chatbot 150 may communicate with the user device 530 via audio, text messages, instant messages, video, e-mail, application notifications, and/or any other suitable communication means. The user device 530 may comprise one or more of desktop computers, laptops, smartphones, wearables, smart watches, smart contact lenses, smart glasses, augmented reality glasses, virtual reality headsets, mixed or extended reality glasses or headsets, and/or any other suitable communication device.

In one aspect, the server 105, e.g., via NLP model 148 and/or the chatbot 150, may analyze the communication session with the insurance provider 540 and/or the user for indications of sentiment, such as the emotion of the insurance provider or user (e.g., upset, stressed, calm, frustrated, impatient, etc. Other types of suitable analysis and/or analytics may be obtained from the communication session information.

In one aspect, types of data the communication sessions may generate may include the length of the session, which may indicate how effective the chatbot 150 is at gathering or providing necessary information (e.g., a short session may not gather enough information; a long session may provide too much and/or inaccurate information). Another type of data the session may generate may include how many requests were generated by the chatbot 150, which may also indicate the quality and/or effectiveness of the session (e.g., too few questions may not gather enough information and too many questions may indicate ineffectiveness of the questions being asked). The number of requests may also indicate when the session warrants termination, for example the chatbot 150 may no longer have any requests to generate which may indicate all information relevant may be gathered. Any suitable analytics and/or data may be generated and or analyzed from the session which may indicate the quality and/or effectiveness of the session and/or chatbot 150.

In one aspect, the chatbot 150 may determine a confidence level at one or more instances during the communication session. The confidence level and/or score, which may be a number between 0 and 1, may represent the likelihood that the output of the chatbot 150 is correct and will satisfy the insurance provider 340's or the user's request. As the output of the chatbot 150 may include one or more predictions, each prediction may have a confidence score wherein the higher the score, the more confident the chatbot 150 is that the prediction may satisfy the insurance provider 340's or the user's request. In conversational AI/ML which may include the chatbot 150, one or more stages may process the request and/or input of the insurance provider 340 or the user. In one aspect, during NLU, the chatbot 150 may predict the insurance provider 340 or user intent (what the service provider or user is looking for) from an utterance/prompt (what the service provider or user may say or type). In one aspect, during sentiment and/or emotion analysis, the chatbot 102 may predict the sentiment (e.g., positive, negative, or neutral) and/or the emotion of the insurance provider 540 or user based upon the insurance provider 540 or user utterance and/or prompt (back and forth between the service provider or user and the chatbot 150) transcript. In one aspect, during NLG, the chatbot 150 may predict what to respond based upon the insurance provider 540 or user utterance/prompt. One or more of these predictions may have an associated confidence score/level.

In one aspect, the server 105 and/or chatbot 150 may determine the confidence level based upon the interactions between the chatbot 150 and the insurance provider 540 or user during the communication session, e.g., how accurately does it seem the chatbot 150 is able to interpret the insurance provider 540 or user responses, how effective are chatbot 150 requests, and/or other suitable metrics and/or analysis of the communication session to determine the confidence level of the chatbot 150. In one aspect, the chatbot 150 confidence level may be compared to a threshold confidence level (e.g., which may also be a value between 0 and 1) by the server 105 and/or chatbot 150. If the chatbot 150 confidence level falls below the threshold, one or more actions may be taken by the server 105 and/or chatbot 150, such as ending the communication session, using a different chatbot 150 to continue the communication session (e.g., one which may be trained to more effectively assist the insurance provider 540 provider or user), and/or any other suitable action as may be described herein.

Figure 6:
FIG. 6 depicts an exemplary computer-implemented method for flood monitoring and service provider notification.
Figure 6:
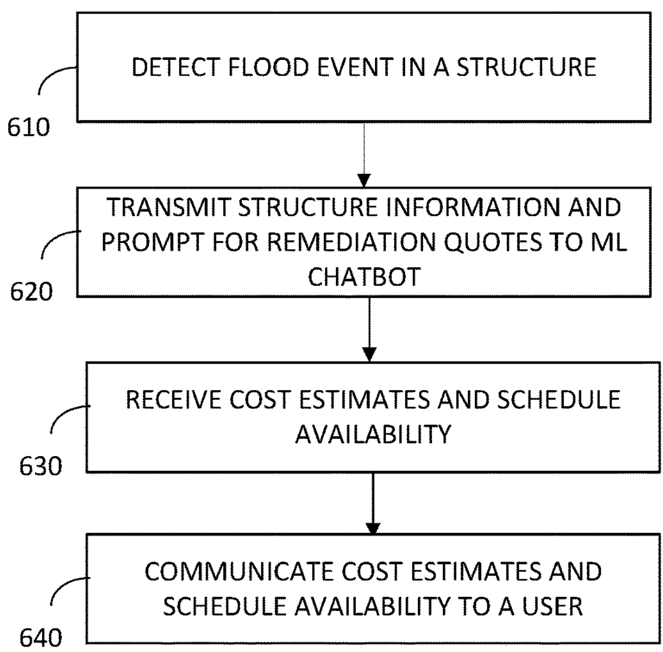

Exemplary Computer-Implemented Method for Flood Detection and Remediation Provider Notification FIG. 6 depicts a flow diagram of an exemplary computer-implemented method 600 for flood detection and remediation provider notification. One or more steps of the method 600 may be implemented as a set of instructions stored on a computer-readable memory and executable on one or more processors. The method 600 of FIG. 6 may be implemented via one or more systems, such as monitoring device 102 and/or server 105.

In one embodiment, the computer-implemented method 600 may include training an ML chatbot (such as the ML chatbots 150 or 250) with a training dataset and/or validating the ML chatbot with a validation dataset. The training dataset and/or the validation dataset may comprise historical data from past notices of flood events, service provider names, cost estimates, schedule availabilities, transcripts of telephone and/or chat sessions with service providers, and/or user ratings of the chatbot output.

In one embodiment, the computer-implemented method 600 may include at block 610 detecting a flood event in a structure (such as structure 310, 410, or 510). Detecting a flood event may comprise receiving a signal from a water sensor (such as sensors 450 or 550). Detecting a flood event may comprise receiving a notification of precipitation exceeding a specified amount. Detecting a flood event may comprise receiving a notification of an occurrence of precipitation and detecting an interruption of electricity to the structure.

In one embodiment, the computer-implemented method 600 at block 620 may include transmitting structure information and prompt for flood remediation service quotes to the ML chatbot (such as ML chatbot 150 or 250). The structure information and prompt may be sent via a text message, application, e-mail, FTP. HTTP, HTTPS, and/or any other suitable communication method.

The prompt for flood remediation quotes may cause the ML chatbot to request flood cleanup from one or more remediation service providers, receive cost estimates from the one or more remediation service providers, and receive schedule availability from the one or more remediation service providers. The prompt may cause the ML chatbot to request the flood cleanup from one or more remediation service providers via telephone by converting a text output into a voice output, receive cost estimates from the one or more remediation service providers via telephone by converting a first voice input into a first text input, and receive schedule availability from the one or more remediation service providers via telephone by converting a second voice input into a second text input. The prompt may cause the ML chatbot to negotiate price based upon the cost estimates. The prompt may cause the ML chatbot to order flood cleanup from a selected one of the one or more remediation service providers.

In one embodiment, the computer-implemented method 600 at block 630 may include requesting flood cleanup services from one or more service providers. The requests may be communicated via a text message, e-mail, telephone, and/or any other suitable communication method. The requests may be communicated via telephone by converting a text output into a voice output.

In one embodiment, the computer-implemented method 600 at block 640 may include receiving cost estimates from one or more remediation providers. The cost estimates may be received via a text message, e-mail, telephone, and/or any other suitable communication method. The cost estimates may be received via telephone by converting a voice input into a text input.

In one embodiment, the computer-implemented method 600 at block 650 may include receiving schedule availability from one or more remediation providers. The schedule availability may be received via a text message, e-mail, telephone, and/or any other suitable communication method. The schedule availability may be received via telephone by converting a voice input into a text input.

In one embodiment, the computer-implemented method 600 at block 660 may include communicating the cost estimates and schedule availability to a user. The cost estimates and schedule availability may be communicated via a text message, e-mail, telephone, application, and/or any other suitable communication method. The cost estimates and schedule availability may be communicated via telephone by converting a text output into a voice output.

It should be understood that not all blocks of the exemplary flow diagram 600 are required to be performed. Moreover, the exemplary flow diagram 600 is not mutually exclusive (i.e., block(s) from exemplary flow diagram 600 may be performed in any particular implementation).

ADDITIONAL CONSIDERATIONS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods may be illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments may be described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity that may be physically constructed, permanently configured (e.g., hardwired), or temporarily configured (e.g., programmed) to operate in a certain manner or to perform certain operations described herein. Considering embodiments in which hardware modules may be temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In some embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing." "computing," "calculating." "determining," "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, yet still co-operate or interact with each other. The embodiments are not limited in this context.

As used herein, the terms "comprises," "comprising." "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

The systems and methods described herein are directed to an improvement to computer functionality and improve the functioning of conventional computers.

What is claimed:

1. A computer system for flood monitoring and remediation service provider notification, the computer system comprising:

one or more processors;

a memory storing executable instructions thereon that, when executed by the one or more processors, cause the one or more processors to:

periodically poll a weather server to request weather data, in response to the periodic polling, receiving, from the weather server, the weather data, receive an electrical power interruption alarm from a sensor, detect a flood event in a structure based upon (i) the periodically received weather data, and (ii) the electrical power interruption alarm, integrate the received weather data, electrical power interruption alarm, and information associated with the structure to generate a transmission dataset, generate a prompt for flood remediation services, the prompt including information about the flood event, transmit the transmission dataset and the prompt for flood remediation services to a machine learning (ML) chatbot to cause the ML chatbot to:

request flood cleanup from one or more remediation service providers, receive cost estimates from the one or more remediation service providers, and receive schedule availability from the one or more remediation service providers, receive, from the ML chatbot, the cost estimates and the schedule availability, and communicate the cost estimates and/or the schedule availability to a user associated with the structure.

2. The computer system of claim 1, wherein the instructions, when executed by the one or more processors, further cause the one or more processors to perform the detection of the flood event in the structure by receiving a signal from a water sensor.

3. The computer system of claim 1, wherein the instructions, when executed by the one or more processors, further cause the one or more processors to perform the detection of the flood event in the structure by receiving a notification of an occurrence of precipitation.

4. The computer system of claim 1, wherein the prompt for flood remediation services causes the ML chatbot to:

request flood cleanup from one or more remediation service providers via telephone by converting a text output into a voice output, and receive cost estimates and/or schedule availability from the one or more remediation service providers via telephone by converting a voice input into a text input.

5. The computer system of claim 1, wherein the prompt for flood remediation services further causes the ML chatbot to negotiate price based upon the cost estimates.

6. The computer system of claim 1, wherein the prompt for flood remediation services further causes the ML chatbot to order flood remediation services from a selected one of the one or more remediation service providers.

7. The computer system of claim 1, wherein the instructions, when executed by the one or more processors, further cause the one or more processors to:

receive a selected remediation service provider from the user, and transmit the selected remediation service provider and a prompt for a remediation service request to the ML chatbot to cause the ML chatbot to request a remediation service from the selected remediation service provider.

8. A computer-implemented method for flood monitoring and remediation service provider notification, the method comprising:

periodically polling a weather server to request weather data, in response to the periodic polling, receiving, from the weather server, the weather data, receiving an electrical power interruption alarm from a sensor, detecting a flood event in a structure based upon (i) the periodically received weather data, and (ii) the electrical power interruption alarm, integrating the received weather data, electrical power interruption alarm, and information associated with the structure to generate a transmission dataset, generating a prompt for flood remediation services, the prompt including information about the flood event, transmitting the transmission dataset and the prompt for flood remediation services to a machine learning (ML) chatbot to cause the ML chatbot to:

request flood cleanup from one or more remediation service providers, receive cost estimates from the one or more remediation service providers, and receive schedule availability from the one or more remediation service providers, receiving, from the ML chatbot, the cost estimates and the schedule availability, and communicating the cost estimates and/or the schedule availability to a user associated with the structure.

9. The computer-implemented method of claim 8, wherein the detection of the flood event in the structure comprises receiving a signal from a water sensor.

10. The computer-implemented method of claim 8, wherein the prompt for flood remediation services causes the ML chatbot to:

request flood cleanup from one or more remediation service providers via telephone by converting a text output into a voice output, and receive cost estimates and/or schedule availability from the one or more remediation service providers via telephone by converting a voice input into a text input.

11. The computer-implemented method of claim 8, wherein the prompt for flood remediation services further causes the ML chatbot to negotiate price based upon the cost estimates.

12. The computer-implemented method of claim 8, wherein the prompt for flood remediation services further causes the ML chatbot to order flood remediation services from a selected one of the one or more remediation service providers.

13. The computer-implemented method of claim 8 further comprising:

receiving a selected remediation service provider from the user, and transmitting the selected remediation service provider and a prompt for a remediation service request to the ML chatbot to cause the ML chatbot to request a remediation service from the selected remediation service provider.

14. A computer-readable storage medium storing non-transitory computer-readable instructions for flood monitoring and remediation service provider notification, wherein the instructions when executed on one or more processors cause the one or more processors to:

periodically poll a weather server to request weather data, in response to the periodic polling, receiving, from the weather server, the weather data, receive an electrical power interruption alarm from a sensor, detect a flood event in a structure based upon (i) the periodically received weather data, and (ii) the electrical power interruption alarm, integrate the received weather data, electrical power interruption alarm, and information associated with the structure to generate a transmission dataset, generate a prompt for flood remediation services, the prompt including information about the flood event, transmit the transmission dataset and the prompt for flood remediation services to a machine learning (ML) chatbot to cause the ML chatbot to:

request flood cleanup from one or more remediation service providers, receive cost estimates from the one or more remediation service providers, and receive schedule availability from the one or more remediation service providers, receive, from the ML chatbot, the cost estimates and the schedule availability, and communicate the cost estimates and/or the schedule availability to a user associated with the structure.

15. The computer-readable storage medium of claim 14, wherein the instructions, when executed by the one or more processors, further cause the one or more processors to perform the detection of the flood event in the structure by receiving a signal from a water sensor.

16. The computer-readable storage medium of claim 14, wherein the instructions, when executed by the one or more processors, further cause the one or more processors to perform the detection of the flood event in the structure by receiving a notification of an occurrence of precipitation.

17. The computer-readable storage medium of claim 14, wherein the prompt for flood remediation services causes the ML chatbot to:

request flood cleanup from one or more remediation service providers via telephone by converting a text output into a voice output, and receive cost estimates and/or schedule availability from the one or more remediation service providers via telephone by converting a voice input into a text input.

18. The computer-readable storage medium of claim 14, wherein the prompt for flood remediation services further causes the ML chatbot to negotiate price based upon the cost estimates.

19. The computer-readable storage medium of claim 14, wherein the prompt for flood remediation services further causes the ML chatbot to order flood remediation services from a selected one of the one or more remediation service providers.

20. The computer-readable storage medium of claim 14, wherein the instructions, when executed by the one or more processors, further cause the one or more processors to:

receive a selected remediation service provider from the user, and transmit the selected remediation service provider and a prompt for a remediation service request to the ML chatbot to cause the ML chatbot to request a remediation service from the selected remediation service provider.

* * * * *